United States Patent
Hayashino

(10) Patent No.: US 9,843,419 B2
(45) Date of Patent: Dec. 12, 2017

(54) WIRELESS COMMUNICATION DEVICE AND METHOD FOR CONTROLLING WIRELESS COMMUNICATION DEVICE

(71) Applicant: Panasonic Intellectual Property Management Co., Ltd., Osaka (JP)

(72) Inventor: Hiroshi Hayashino, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 155 days.

(21) Appl. No.: 14/829,821

(22) Filed: Aug. 19, 2015

(65) Prior Publication Data

US 2016/0119800 A1 Apr. 28, 2016

(30) Foreign Application Priority Data

Oct. 28, 2014 (JP) .................................. 2014-219562

(51) Int. Cl.
| | |
|---|---|
| *H04L 1/08* | (2006.01) |
| *H04L 1/16* | (2006.01) |
| *H04B 17/345* | (2015.01) |

(52) U.S. Cl.
CPC ............. *H04L 1/08* (2013.01); *H04B 17/345* (2015.01); *H04L 1/16* (2013.01)

(58) Field of Classification Search
None
See application file for complete search history.

(56) References Cited

U.S. PATENT DOCUMENTS

| | | | | |
|---|---|---|---|---|
| 2007/0280332 | A1* | 12/2007 | Srikanteswara | H04B 1/10 375/130 |
| 2009/0005092 | A1* | 1/2009 | Li | H04W 28/18 455/501 |
| 2011/0021153 | A1* | 1/2011 | Safavi | H04B 7/0434 455/63.1 |
| 2012/0157007 | A1* | 6/2012 | Yoneyama | H04L 1/20 455/67.14 |

FOREIGN PATENT DOCUMENTS

JP 2012-235506 11/2012

* cited by examiner

*Primary Examiner* — Mohammad Adhami
(74) *Attorney, Agent, or Firm* — Greenblum & Bernstein, P.L.C.

(57) ABSTRACT

A wireless communication device includes: a wireless communicator and a communication controller. When the wireless communicator does not receive an ACK signal corresponding to first data from the destination wireless communication device after transmitting the first data, the communication controller causes the wireless communicator to retransmit the first data, and, when the wireless communicator receives an ACK signal corresponding to first data from the destination wireless communication device after transmitting the first data to the destination wireless communication device, the communication controller causes the wireless communicator to transmit second data that is subsequent to the first data to the destination wireless communication device at a timing at which a prescribed time period has elapsed after transmitting the first data or after receiving the ACK signal, the prescribed time period corresponding to a period of an interference wave produced due to an interference device operating has elapsed.

13 Claims, 18 Drawing Sheets

WIRELESS COMMUNICATION DEVICE AND METHOD FOR CONTROLLING WIRELESS COMMUNICATION DEVICE

BACKGROUND

1. Technical Field

The present disclosure relates to a wireless communication device and a method for controlling a wireless communication device.

2. Description of the Related Art

Wireless communication systems that are generally widespread such as wireless LANs represented by IEEE 802.11, wireless personal area networks (PANs) represented by Bluetooth (registered trademark), or cordless telephones use wireless frequency bands that are able to be used in a versatile manner referred to as industrial, scientific and medical (ISM) bands. Among the ISM bands, the 2.4 GHz band used by IEEE 802.11 and Bluetooth (registered trademark) is not only used by these wireless communication systems but also by microwave ovens. There is therefore a problem in that electromagnetic waves generated by a microwave oven interfere with wireless communication systems as disturbance waves and communication cannot be carried out in a stable manner.

Technology for avoiding interference from an interference source such as a microwave oven has been proposed in order to deal with this kind of problem (Japanese Patent No. 5351313, for example).

SUMMARY

However, wireless communication technology with which more stable wireless communication can be carried out while mitigating the effects of this kind of interference is desired.

One non-limiting and exemplary embodiment provides a wireless communication device and a wireless communication method with which more stable wireless communication can be carried while mitigating interference from an interference source during wireless communication.

In one general aspect, the techniques disclosed here feature a wireless communication device provided with: a wireless communicator that communicates with a destination wireless communication device via a wireless communication network; and a communication controller that controls a transmission of data to the destination wireless communication device, in which, when the wireless communicator does not receive an ACK signal corresponding to first data from the destination wireless communication device after transmitting the first data to the destination wireless communication device, the communication controller causes the wireless communicator to retransmit the first data, and, when the wireless communicator receives an ACK signal corresponding to first data from the destination wireless communication device after transmitting the first data to the destination wireless communication device, the communication controller causes the wireless communicator to transmit second data that is subsequent to the first data to the destination wireless communication device at a timing at which a prescribed time period has elapsed after transmitting the first data or after receiving the ACK signal, the prescribed time period corresponding to a period of an interference wave produced due to an interference device operating has elapsed.

It should be noted that general or specific aspects thereof may be realized by a system, a device, a method, a recording medium, or a computer program, and may be realized by an arbitrary combination of a system, a device, a method, a recording medium, and a computer program.

A wireless communication device of the present aspect can carry out more stable wireless communication while mitigating interference from an interference source during wireless communication.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of Aspect of the Present Disclosure

In recent years, IEEE 802.11 and Bluetooth (registered trademark) have been mounted in not only PCs, mobile telephones, or AV devices such as televisions and cameras but also white goods such as air conditioners and refrigerators, and form household wireless communication networks. Many of these white goods are installed in the kitchen within a home, and the effect of electromagnetic waves generated by an interference device (a microwave oven, for example) is a problem.

With regard to this kind of problem, in Japanese Patent No. 5351313, the level of a disturbance wave is measured, it is determined whether or not an interference determination threshold value has been exceeded, and it is detected that an ACK response to a transmission packet is missing to thereby detect that there has been a wireless communication error caused by interference. With this technology, it becomes possible to detect that a wireless communication error has occurred by the factors caused by the generation of interference (Japanese Patent No. 5351313).

Furthermore, a wireless communication device corresponding to IEEE 802.11 has a multi-rate function that selects an optimal transmission rate from a plurality of transmission rates to carry out wireless communication, and therefore, if a wireless communication error has occurred, fallback control that decreases the transmission rate to improve reception sensitivity is carried out. However, the packet length increases when the transmission rate is decreased due to the fallback control, and it therefore becomes even easier to be affected by interference.

Figure 17:
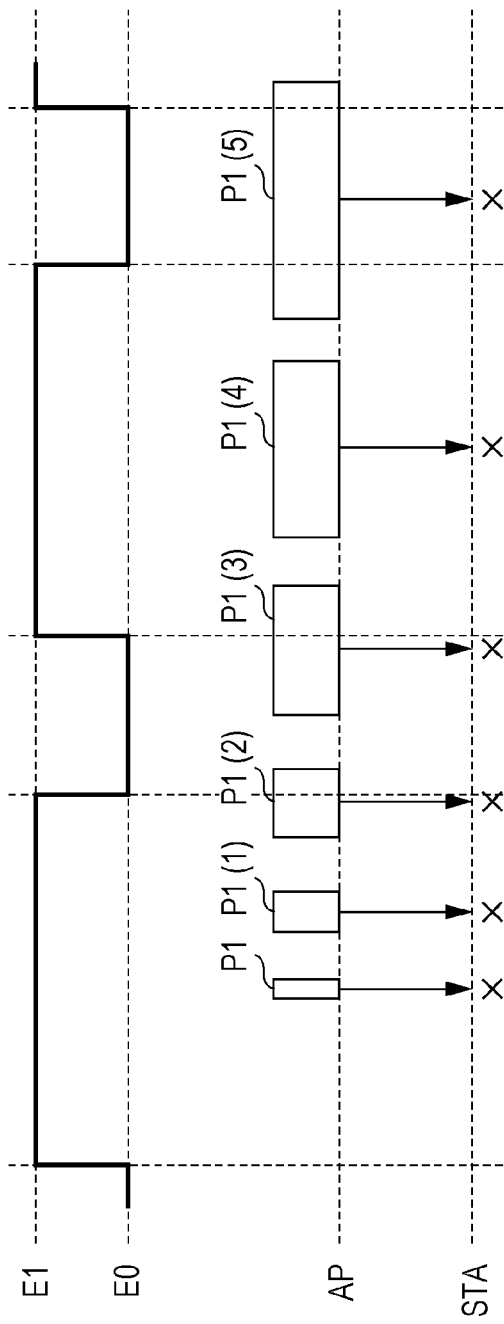
FIG. 17 is a drawing depicting the relationship between interference waves and the number of times that packets are transmitted in the related art.

FIG. 17 will be used to describe this problem in detail. Hereinafter, a situation in which an interference device is a microwave oven will be described as an example.

In FIG. 17, as an example, a packet P1 is transmitted from an access point (hereinafter, AP) that is the transmission source to a station (hereinafter, ST) that is the destination. Disturbance waves caused by interference from a microwave oven are periodically generated, and the reception power level of the disturbance waves when generated is taken as E1 and the reception power level of the disturbance waves when not generated is taken as E0. Furthermore, the AP carries out carrier sensing before transmitting the packet P1 in order to confirm whether another wireless terminal is transmitting packets.

IEEE 802.11 includes, as carrier sensing schemes, a reception power level detection scheme to measure reception power to determine whether another wireless terminal is transmitting packets, and a preamble detection scheme to detect a preamble, which is a physical layer header of a packet transmitted by another wireless terminal.

The 2.4 GHz band is an extremely congested wireless band shared by many wireless communication systems, and therefore there is a possibility of an opportunity to transmit being missed with the carrier sensing of the reception power level detection scheme. Therefore, the carrier sensing of the preamble detection scheme is generally used in the 2.4 GHz band.

The AP carries out the carrier sensing of the preamble detection scheme, and packet transmission is therefore started even during intervals in which the microwave oven is emitting electromagnetic waves. The packet P1 transmitted by the AP is affected by interference from the microwave oven, a reception error occurs at the STA, and an ACK response for the packet P1 is therefore not returned. Since there is no ACK response from the STA, the AP transmits a retransmission packet P1(1) for the packet P1. At such time, transmission is carried out with the transmission rate being lower than when the packet P1 was transmitted, and therefore the time period length increases even though it is the same packet. Thereafter, retransmission is repeated while similarly decreasing the transmission rate each time retransmission is carried out. Therefore, the packet length does not fall within an interval in which the microwave oven is not generating electromagnetic waves, and it is not possible to avoid the effects of interference from the microwave oven.

With regard to this kind of problem, according to the technology described in Japanese Patent No. 5351313 and so forth, if it is determined that interference from a microwave oven is having an effect, fallback control is stopped, the transmission rate is fixed at a fixed rate, and the number of times that retransmission is carried out is increased compared with during normal communication that is unaffected by interference. According to this technology, the effects of interference can be avoided even when affected by interference from a microwave oven.

Figure 18:
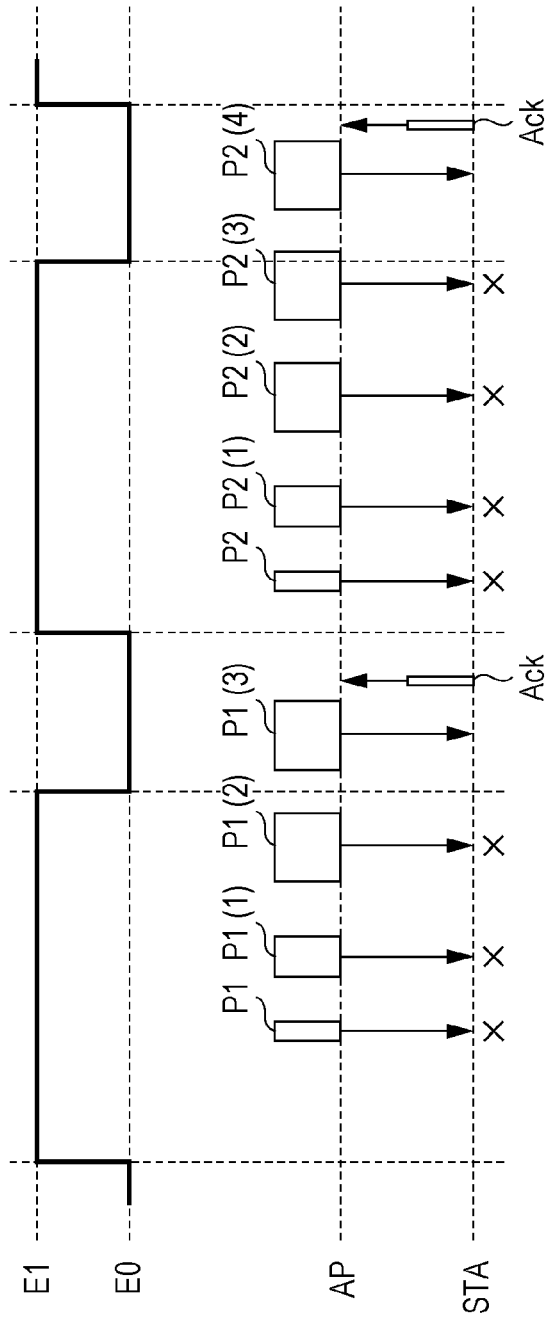
FIG. 18 is a drawing depicting the conventional relationship between interference waves and the number of times that packets are transmitted.

However, in the aforementioned conventional technology, there is a problem in that retransmission is unnecessarily carried out in order to repeat retransmission each time wireless communication is started in an interval in which the microwave oven is emitting electromagnetic waves. FIG. 18 will be used to describe this problem in detail.

In FIG. 18, similar to FIG. 17, a packet is transmitted from an AP to an STA if there are effects of interference from a microwave oven. The AP carries out carrier sensing of the preamble detection scheme and then transmits a packet P1 to the STA. Due to the effects of the electromagnetic waves generated by the microwave oven, the STA is not able to properly receive the packet P1 and does not return an ACK response. Since there is no ACK response from the STA, the AP transmits a retransmission packet P1(1). At such time, the packet length of the packet P1(1) becomes longer than the packet P1 due to the fallback control. Thereafter, similarly, the STA is not able to receive a packet and the AP repeats retransmission.

Therefore, according to the method described in Japanese Patent No. 5351313, feedback control is stopped if it is determined that there are effects of interference from a microwave oven. In FIG. 18, fallback control is stopped at the third retransmission and a packet P1(3) is transmitted at the same transmission rate as a packet P1(2), and therefore the packet lengths of the packet P1(2) and the packet P1(3) are the same. Therefore, the packet P1(3) can be transmitted in an interval in which the microwave oven does not generate electromagnetic waves, and the STA is able to properly receive the packet P1(3).

Next, the AP attempts to transmit a packet P2 but, similar to when the packet P1 was transmitted, retransmission is repeated due to the effects of interference from the microwave oven, an ACK response is received from the STA when a retransmission packet P2(4) is transmitted, and wireless communication is successful. However, repeating retransmission each time a packet is newly transmitted unnecessarily consumes the transmission power of the AP constituting the transmission side and, in addition, repeating retransmission many times results in the wireless band being occupied. Therefore, transmission opportunities decrease for a wireless terminal that is in a location where there are no effects of interference from the microwave oven.

Furthermore, in the aforementioned conventional technology, there is a problem in that, when only the reception-side wireless terminal is set up in a location where there are effects of interference from the microwave oven, the transmission-side wireless terminal is not able to detect that a wireless communication error due to interference from the microwave oven has occurred.

The present disclosure takes the aforementioned problems into consideration and provides a wireless communication device and a wireless communication method that avoid retransmission being unnecessarily repeated even when a wireless communication error caused by the generation of interference from an interference device such as a microwave oven has occurred.

Furthermore, in the IEEE 802.11 standard, a beacon is periodically transmitted in order for an access point (AP) to establish time synchronization and notify information regarding terminals in sleep mode and so forth. Furthermore, when a station (STA) is not able to receive a beacon transmitted by the AP for a prescribed interval, the connection with the currently connected AP is severed and an attempt is newly made to search for an AP and connect thereto. Consequently, when a beacon is not able to be received for a prescribed interval due to the effects of interference from an interference device, the STA severs the connection with the AP.

Thus, a wireless communication device according to an embodiment of the present disclosure is provided with: a wireless communicator that communicates with a destination wireless communication device via a wireless communication network; and a communication controller that controls a transmission of data to the destination wireless communication device, in which, when the wireless communicator does not receive an ACK signal corresponding to first data from the destination wireless communication device after transmitting the first data to the destination wireless communication device, the communication controller causes the wireless communicator to retransmit the first data, and, when the wireless communicator receives an ACK signal corresponding to first data from the destination wireless communication device after transmitting the first data to the destination wireless communication device, the communication controller causes the wireless communicator to transmit second data that is subsequent to the first data to the destination wireless communication device at a timing at which a prescribed time period has elapsed after transmitting the first data or after receiving the ACK signal, the prescribed time period corresponding to a period of an interference wave produced due to an interference device operating has elapsed.

It is thereby possible to carry out wireless communication in an interval in which disturbance waves generated by an interference device have stopped, and to avoid retransmission being repeated many times due to the effects of interference from the interference device. Here, examples of an interference device include a microwave oven, a video streaming system that carries out synchronized distribution, and a wireless control system that periodically monitors a terminal or the like.

For example, each time the first data is retransmitted in a first transmission interval, the communication controller sets a transmission rate of the first data lower than the transmission rate used in the preceding transmission, and, when the ACK signal corresponding to the first data is received from the destination wireless communication device, the communication controller sets the transmission rate used for transmission of the second data to a transmission rate used when the first data is initially transmitted.

For example, when a TSF timer value used for synchronizing each wireless communication device belonging to the wireless communication network is received from the destination wireless communication device, the communication controller uses the received TSF timer value to determine the transmission timing of the previously transmitted first data, and the communication controller transmits the second data to the destination wireless communication device at a timing at which the prescribed time period has elapsed after transmitting the first data.

For example, the wireless communication communicates with wireless communication devices, and the communication controller causes the wireless communicator to transmit the second data to a wireless communication device that has transmitted the TSF timer value from among the wireless communication devices, and performs normal transmission of the second data to a wireless communication device that has not transmitted the TSF timer value from among the wireless communication devices.

For example, a signal indicating that data transmission is to be performed in a prescribed interval is transmitted to a destination wireless communication device that has transmitted the TSF timer value.

For example, when the ACK signal is received, the communication control unit reads out a timer counter value for synchronization retained by each wireless communication device, and subtracts a prescribed value to thereby calculate the TSF timer value.

For example, a first period and a second period having different values are set in the communication controller as periods corresponding to interference waves of the interference device, and, when the wireless communicator does not receive an ACK signal corresponding to the second data from the destination wireless communication device after transmitting the second data using a prescribed time period corresponding to either the first period or the second period, the communication controller switches a transmission interval for the second data from the one period to the other period from among the first period and the second period.

According to the aforementioned configurations, even when the period in which disturbance waves are output is different due to the region in which an interference device is set up, by changing that period, it becomes possible to avoid the effects of the disturbance waves from the interference device for wireless communication to be carried out properly.

For example, the first period and the second period are either 50 Hz or 60 Hz.

For example, the interference device is a microwave oven and a period corresponding to an interference wave of the microwave oven is a period of a radio wave generated by an inverter-type microwave oven, and, when the wireless communicator does not receive an ACK signal corresponding to the second data from the destination wireless communication device after transmitting the second data at a timing at which the prescribed time period has elapsed, the communication controller causes the wireless communicator to performs carrier sensing within a fixed interval after transmitting the second data, the communication controller determines a signal strength by performing the carrier sensing, and, when the signal strength is equal to or less than a prescribed threshold value, the communication controller switches a data transmission interval to a period of a radio wave generated by a trans-type microwave oven.

For example, the interference device is a microwave oven and a period corresponding to an interference wave of the microwave oven is a period of a radio wave generated by an inverter-type microwave oven, when the wireless communicator does not receive an ACK signal corresponding to the second data from the destination wireless communication device after transmitting the second data in a second transmission interval, the communication controller causes the wireless communicator to transmit packet data within a fixed interval after transmitting the second data, and, when the wireless communicator receives an ACK signal from the destination wireless communication device in response to transmission of the packet data, the communication controller switches a data transmission interval to a period of a radio wave generated by a trans-type microwave oven.

According to the aforementioned configurations, even when the periods in which a microwave stops the output of disturbance waves are different due to differences in the type of microwave oven, those stop intervals can be detected and efficient wireless communication can be carried out.

For example, in the communication controller, being within the fixed interval constitutes an interval from the timer value to two periods elapsing from after one period of the interference wave of the microwave oven has elapsed.

For example, in the communication controller, the fixed interval constitutes an interval from the timer value to one period and a ¼ period, or one period and a ½ period, or one period and a ¾ period of the interference wave of the microwave oven elapsing.

Furthermore, a method for controlling a wireless communication device of the present disclosure is a method for controlling a wireless communication device that communicates with a destination wireless communication device via a wireless communication network, the method including: transmitting first data to the destination wireless communication device; for an interval in which an ACK signal corresponding to the first data is received from the destination wireless communication device after the first data has been transmitted, retransmitting the first data in a first transmission interval; and, when the ACK signal corresponding to the first data is received from the destination wireless communication device, switching the data transmission interval from the first transmission interval to a second transmission interval that corresponds to a period corresponding to an interference wave of an interference device, and transmitting second data that is subsequent to the first data to the destination wireless communication device at a timing at which the second transmission interval has elapsed after the first data has been transmitted.

For example, a wireless communication device of the present disclosure is provided with: a wireless communicator that communicates with a destination wireless communication device via a wireless communication network; and a communication controller that controls a carrier sensing method with which the availability status of a wireless communication band is confirmed before performing wireless communication to determine whether or not communication is possible, in which: when first data is transmitted to the destination wireless communication device and an ACK signal corresponding to the first data is received from the destination wireless communication device, the communication control unit uses a carrier sensing method with which transmission is started when the reception power level is equal to or higher than a prescribed reception power level and transmission is stopped when the reception power level is lower than the prescribed reception power level; when the ACK signal corresponding to the first data is not able to be received from the destination wireless communication device after the first data has been transmitted to the destination wireless communication device, the communication controller retransmits the first data; when the ACK signal corresponding to the first data has been able to be received from the destination wireless communication device, the communication controller uses a carrier sensing method with which transmission is stopped when a prescribed wireless signal has been received and transmission is started when the prescribed wireless signal has not been received; and the communication controller transmits a beacon signal after having carried out carrier sensing using either of the carrier sensing methods.

According to the aforementioned configurations, even in a state where an interference device operates and there are effects of interference therefrom, wireless communication can be continued without the connection between an AP and an STA being severed.

Furthermore, a method for controlling a wireless communication device of the present disclosure is a method for controlling a wireless communication device that communicates with a destination wireless communication device via a wireless communication network, the method including: when first data is transmitted to the destination wireless communication device and an ACK signal corresponding to the first data is received from the destination wireless communication device, using a carrier sensing method with which transmission is started when a reception power level is equal to or higher than a prescribed reception power level and transmission is stopped when the reception power level is lower than the prescribed reception power level; when the ACK signal corresponding to the first data is not received from the destination wireless communication device after the first data has been transmitted to the destination wireless communication device, retransmitting the first data; when the ACK signal corresponding to the first data is received from the destination wireless communication device, using a carrier sensing method with which transmission is stopped when a prescribed wireless signal has been received and transmission is started when the prescribed wireless signal has not been received; and transmitting a beacon signal after carrier sensing has been carried out using either of the carrier sensing methods.

For example, a wireless communication device of the present disclosure is provided with: a wireless communicator that communicates with a destination wireless communication device via a wireless communication network; and a communication controller that controls a data transmission timing for wireless communication, in which: when first data is transmitted to the destination wireless communication device and an ACK signal corresponding to the first data is received from the destination wireless communication device, the communication control unit transmits a first beacon signal in a first transmission interval; when the ACK signal corresponding to the first data is not received from the destination wireless communication device after the first data has been transmitted to the destination wireless communication device, the communication controller retransmits the first data; and, when the ACK signal corresponding to the first data is received from the destination wireless communication device, the communication controller switches a beacon signal transmission interval from the first transmission interval to a second transmission interval corresponding to a period in which there is an interference wave of an interference device, and transmits a second beacon signal that is subsequent to the first beacon signal to the destination wireless communication device at a timing at which the second transmission interval has elapsed after the first beacon signal has been transmitted.

According to the aforementioned configurations, even in a state where an interference device operates and there are effects of interference therefrom, an AP is able to transmit a beacon during an interval in which disturbance waves generated by the interference device have stopped, it becomes possible for an STA to receive the beacon properly, and wireless communication can be continued without the connection between the AP and the STA being severed.

Furthermore, a method for controlling a wireless communication device of the present disclosure is a method for controlling a wireless communication device that communicates with a destination wireless communication device via a wireless communication network, the method including: when first data is transmitted to the destination wireless communication device and an ACK signal corresponding to the first data is received from the destination wireless communication device, transmitting a first beacon signal in a first transmission interval; when the ACK signal corresponding to the first data is not received from the destination wireless communication device after the first data has been transmitted to the destination wireless communication device, retransmitting the first data; and, when the ACK signal corresponding to the first data is received from the destination wireless communication device, switching a beacon signal transmission interval from the first transmission interval to a second transmission interval corresponding to a period in which there is an interference wave of an interference device, and transmitting a second beacon signal that is subsequent to the first beacon signal to the destination wireless communication device at a timing at which the second transmission interval has elapsed after the first beacon signal has been transmitted.

For example, a wireless communication device of the present disclosure is provided with: a wireless communicator that communicates with a destination wireless communication device via a wireless communication network; and a communication controller that controls a beacon transmission timing for wireless communication, in which: the communication controller transmits a first beacon signal in a first transmission interval; when a TSF timer value used for synchronizing each wireless communication device belonging to the wireless communication network is received from the destination wireless communication device, the communication controller uses the received TSF timer value to determine a transmission timing for a second beacon signal; the communication controller transmits the second beacon signal, which is subsequent to the first beacon signal, to the destination wireless communication device at the transmission timing; and the communication controller switches a beacon signal transmission interval from the first transmission interval to a second transmission interval corresponding to a period in which there is an interference wave of an interference device, and transmits a third beacon signal that is subsequent to the second beacon signal to the destination wireless communication device at a timing at which the second transmission interval has elapsed after the second beacon signal has been transmitted.

Furthermore, a method for controlling a wireless communication device of the present disclosure is a method for controlling a wireless communication device that communicates with a destination wireless communication device via a wireless communication network, the method including: transmitting a first beacon signal in a first transmission interval; when a TSF timer value used for synchronizing each wireless communication device belonging to the wireless communication network is received from the destination wireless communication device, using the received TSF timer value to determine a transmission timing for a second beacon signal; transmitting the second beacon signal, which is subsequent to the first beacon signal, to the destination wireless communication device at the transmission timing; and switching a beacon signal transmission interval from the first transmission interval to a second transmission interval corresponding to a period in which there is an interference wave of an interference device, and transmitting a third beacon signal that is subsequent to the second beacon signal to the destination wireless communication device at a timing at which the second transmission interval has elapsed after the second beacon signal has been transmitted.

According to the aforementioned configurations, even when set up outside of the range of the effects of disturbance waves generated by an interference device, it becomes possible for an AP to transmit a beacon during an interval in which the disturbance waves of the interference device have stopped.

It should be noted that these general or specific aspects may be realized by a system, a method, an integrated circuit, a computer program, or a recording medium such as a computer-readable CD-ROM, and may be realized by an arbitrary combination of a system, a method, an integrated circuit, a computer program, or a recording medium.

Hereafter, embodiments of the present disclosure will be described with reference to the drawings.

Note that the embodiments described hereinafter all represent comprehensive or specific examples. The numerical values, the shapes, the materials, the constituent elements, the arrangement positions and modes of connection of the constituent elements, the steps, and the order of the steps and the like given in the following embodiments are examples and are not intended to limit the present disclosure. Furthermore, from among the constituent elements in the following embodiments, constituent elements that are not described in the independent claims indicating the most significant concepts are described as optional constituent elements.

(Embodiment 1)

Figure 1:
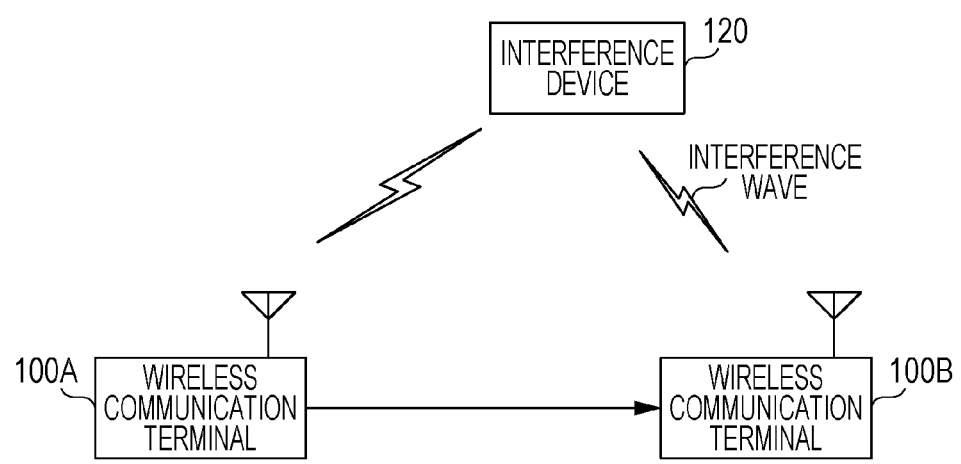
FIG. 1 is a block diagram depicting the configuration of a communication network in Embodiment 1.

FIG. 1 is a block diagram depicting the configuration of a communication network in Embodiment 1 of the present disclosure.

As depicted in FIG. 1, a communication network is provided with a wireless communication terminal 100A, a wireless communication terminal 100B, and an interference device 120.

In this communication network, wireless communication is carried out by radio waves from the wireless communication terminal 100A to the wireless communication terminal 1006. The interference device 120 generates interference waves (disturbance waves). A situation where the interference device 120 is a microwave oven is presented in each embodiment; however, the present disclosure is not restricted thereto. The interference device 120 may be a video streaming system that carries out synchronized distribution or a wireless control system that periodically monitors a terminal or the like.

Communication from the wireless communication terminal 100A to the wireless communication terminal 100B is affected by the interference waves. It should be noted that, in the following description, the wireless communication terminal 100A or the wireless communication terminal 1006 may be referred to as a wireless communication terminal 100.

It should be noted that a wireless communication terminal corresponds to a wireless communication device.

Figure 2:
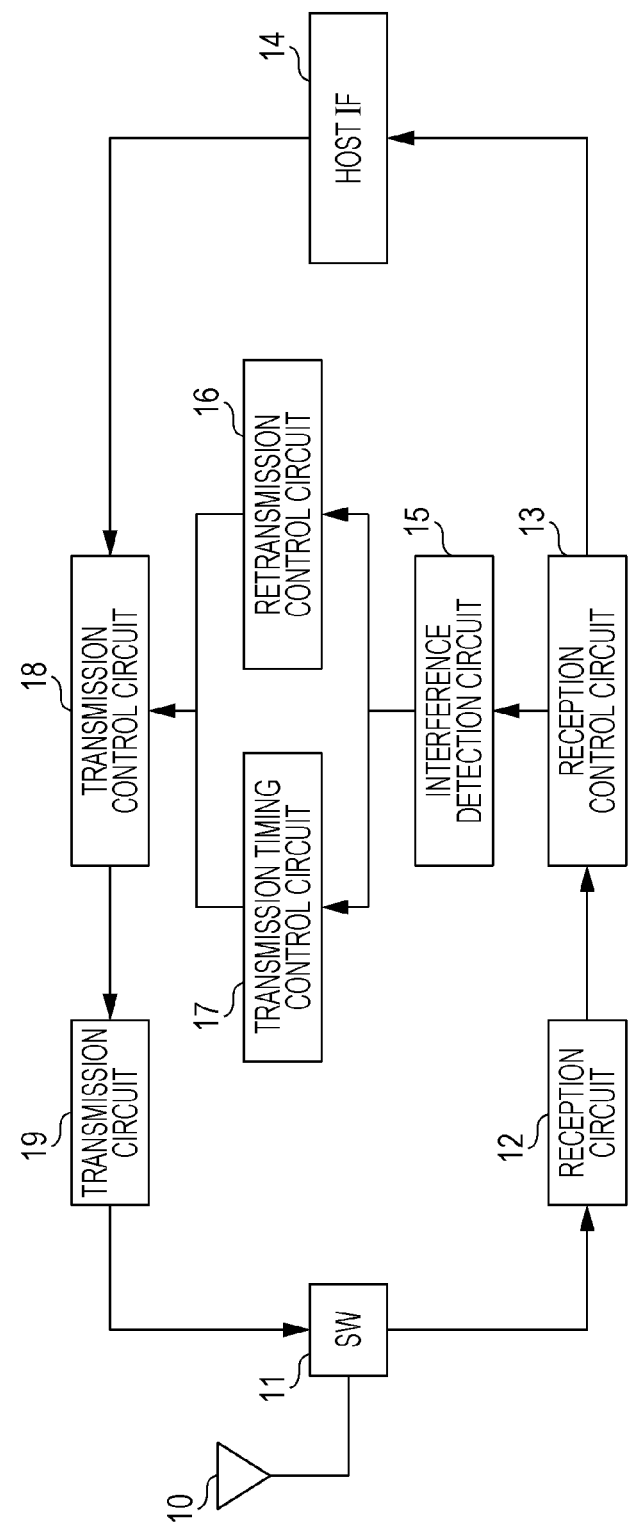
FIG. 2 is a block diagram depicting an example of a wireless communication device in Embodiment 1.

FIG. 2 is a block diagram depicting the configuration of a wireless communication terminal in Embodiment 1 of the present disclosure.

In FIG. 2, the wireless communication terminal 100 is provided with an antenna 10, a switch 11, a reception circuit 12, a reception control circuit 13, a host interface 14, an interference detection circuit 15, a retransmission control circuit 16, a transmission timing control circuit 17, a transmission control circuit 18, and a transmission circuit 19.

The antenna 10 of the wireless communication terminal 100 transmits a prescribed wireless signal to wireless space or receives a prescribed wireless signal from wireless space. Here, a prescribed wireless signal is a wireless signal of the 2.4 GHz band modulated according to the physical layer specifications of the IEEE 802.11 standard.

The switch 11 switches between whether a wireless signal received by the antenna 10 is output to the reception circuit 12 or whether a wireless signal output from the transmission circuit 19 is output to the antenna 10. The reception circuit 12 measures the reception power of a wireless signal, demodulates the received wireless signal, converts the wireless signal into a baseband signal, and outputs the baseband signal to the reception control circuit 13 in frame units together with the measured reception power.

The reception control circuit 13 determines whether or not an error has occurred in a received frame and, if received properly, a data section of the received frame is output to the host interface 14. Furthermore, the reception control circuit 13 distinguishes an ACK response from a wireless communication destination from within the received frame. If an ACK response has not been obtained for a prescribed interval, it is determined that a transmission error has been detected, and that determination result and the reception power are output to the interference detection circuit 15.

The host interface 14 carries out the input and output of data with a host or a higher layer that is not depicted. Data that has been input from the host or the higher layer is input from the host interface 14 to the transmission control circuit 18.

Based on the reception power and the transmission error determination result input from the reception control circuit 13, the interference detection circuit 15 determines whether or not interference has occurred and outputs that result to the retransmission control circuit 16 and the transmission timing control circuit 17.

Based on the interference detection result, the retransmission control circuit 16 controls the number of times that retransmission is carried out and the transmission rate used when retransmission is carried out.

The transmission timing control circuit 17 notifies the transmission timing of a packet to the transmission control circuit 18.

The transmission control circuit 18 configures the data input from the host interface 14 to a transmission frame format specified in IEEE 802.11.

The transmission circuit 19 modulates the aforementioned transmission frame according to a modulation scheme specified in IEEE 802.11 and outputs to the switch 11.

It should be noted that the antenna 10, the switch 11, the reception circuit 12, and the transmission circuit 19 correspond to a wireless communication unit. Furthermore, the reception control circuit 13, the host interface 14, the interference detection circuit 15, the retransmission control circuit 16, the transmission timing control circuit 17, and the transmission control circuit 18 correspond to a communication control unit.

Figure 3:
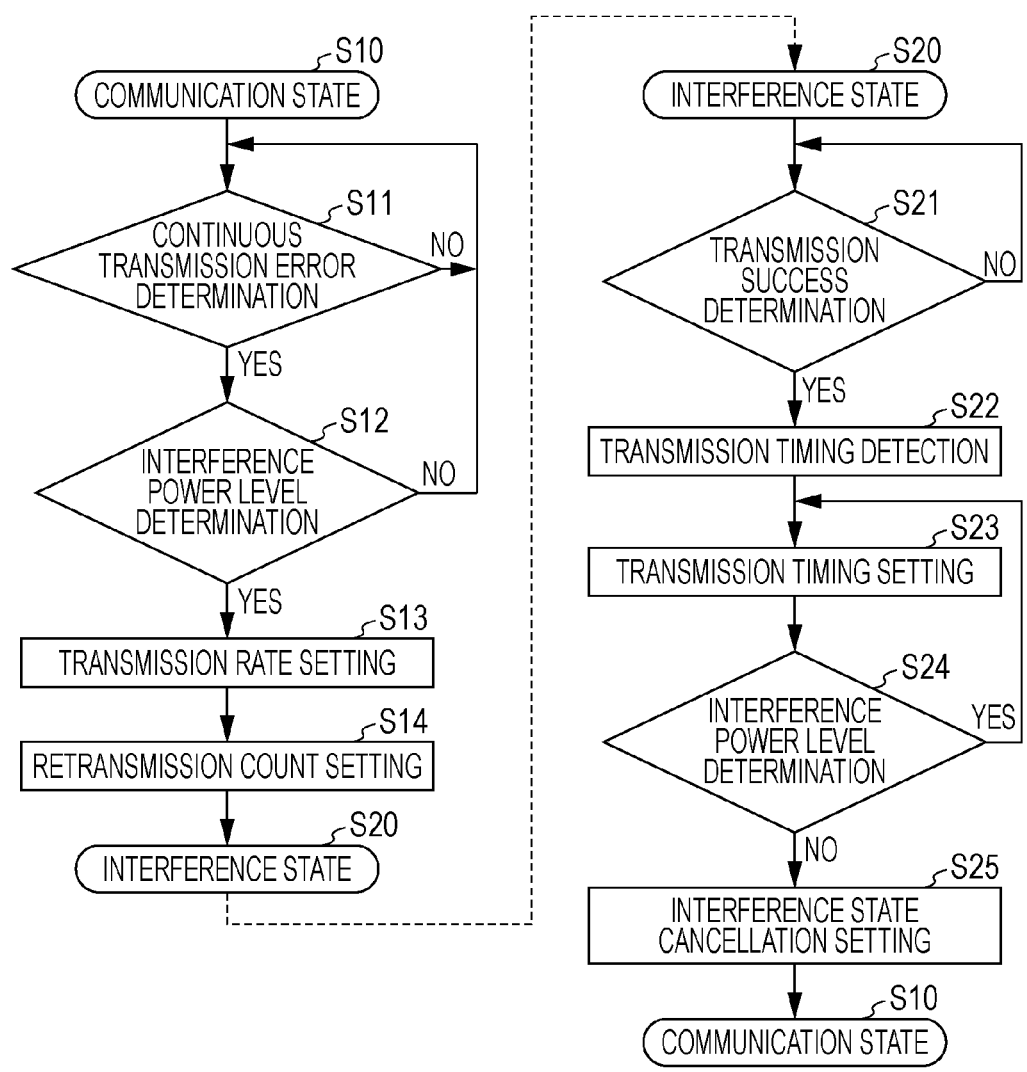
FIG. 3 is a flow diagram depicting interference detection processing by an interference detection circuit, transmission rate setting processing and retransmission count setting processing by a retransmission control circuit, and transmission timing setting processing by a transmission timing control circuit in Embodiment 1.

FIG. 3, will be used to provide a detailed description regarding the operation of the interference detection circuit 15, the retransmission control circuit 16, and the transmission timing control circuit 17 of the wireless communication terminal 100 configured as described above.

In a normal communication state unaffected by interference, the wireless communication terminal 100 transmits a packet to a wireless communication terminal that is a wireless communication destination, and receives an ACK response (S10).

However, if an ACK response has continuously not been able to be received a prescribed number of times due to the effects of interference even though packets have been transmitted, in the interference detection circuit 15, a continuous transmission error is determined (S11) and the reception power level is determined.

If the reception power level is higher than a prescribed power level, it is determined that an interference state has been entered (S12), transmission rate setting and retransmission count setting are carried out, and a transition is made to the interference state (S13 to S14). Here, the aforementioned prescribed power level is a level at which a frame can be received properly in a normal state, or a power level higher than that. Furthermore, in a normal state, the retransmission control circuit 16 carries out retransmission if a wireless communication error has occurred, but carries out fallback control with which the transmission rate during retransmission decreases each time retransmission is carried out. In the transmission rate setting, when a transition is made to the interference state, the transmission rate is set and fixed to the transmission rate of the immediately preceding retransmission or a transmission rate higher than that.

In the interference state, the interference detection circuit 15 fixes the transmission rate and continues retransmission if there is no ACK response from the wireless terminal that is the wireless communication destination, but determines that transmission has been successful if there has been an ACK response (S21).

If it is determined that transmission has been successful, a timer counter value retained by the wireless communication terminal when the ACK response is received is read out, a value obtained by subtracting the data length and the time period required from packet reception to the ACK response from this timer counter value is notified to the transmission timing control circuit 17 as a transmission timing initial value, and the transmission timing control circuit 17 retains the transmission timing initial value (S22). Here, the timer counter value is a timing synchronization function (TSF) timer value specified in IEEE 802.11 and retained by the wireless communication terminal 100, and the AP and the STA synchronize and increment timer counter values.

Next, the transmission timing control circuit 17 sets a counter value obtained by adding an interference period to the aforementioned transmission timing initial value, as a transmission timing (S23). The interference period is ½ of the inverse of the commercial power supply frequency of the microwave oven, and, within Japan, the commercial power supply frequency is 50 Hz in East Japan and 60 Hz in West Japan.

Figure 4:
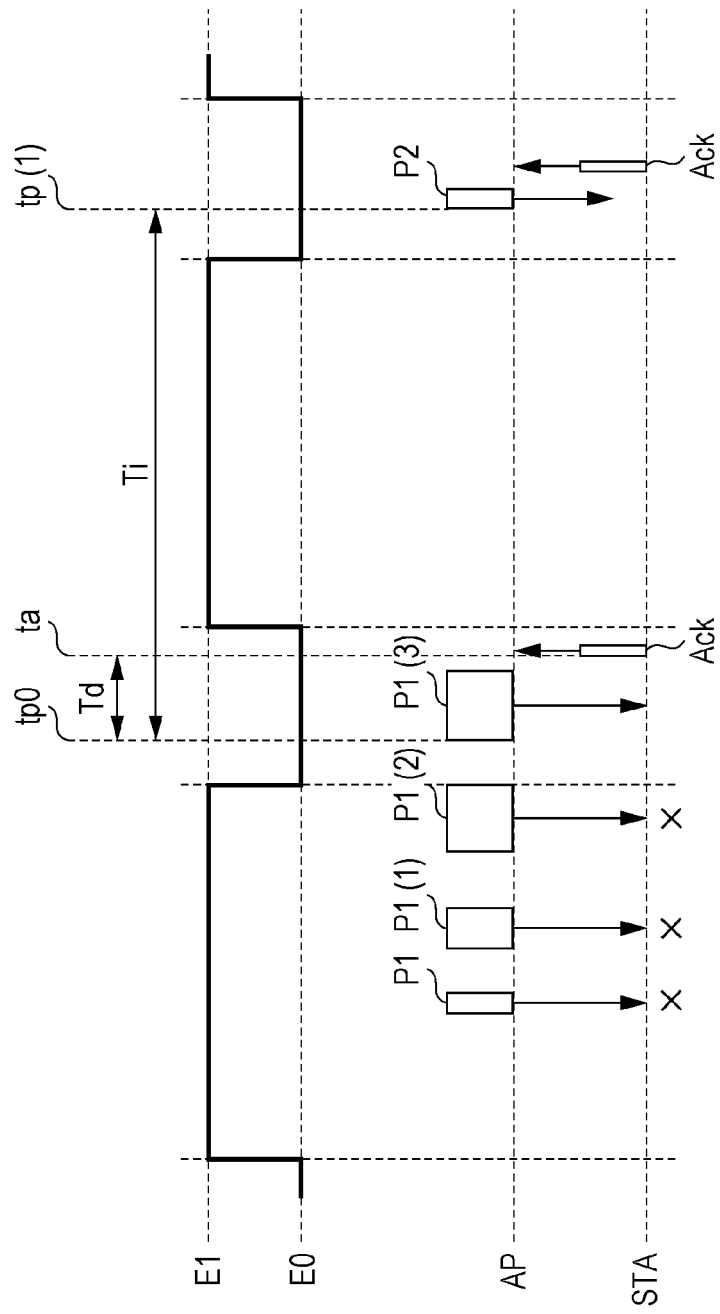
FIG. 4 is a drawing depicting an example of interference waves and packet retransmission between wireless communication devices in Embodiment 1.

Here, FIG. 4 will be used to describe the set value for the transmission timing. FIG. 4 is a drawing depicting electromagnetic waves generated by a microwave oven and the transmission timings of packets transmitted by a wireless communication device in Embodiment 1.

In FIG. 4, as an example, a wireless communication terminal constituting the packet transmission side is taken as an access point (AP) and a wireless communication terminal constituting the packet reception side is taken as an STA. The AP transmits a packet P1 to the STA; however, the STA is not able to properly receive the packet P1 due to the effects of electromagnetic waves generated by the microwave oven and an ACK response is not returned. Since there is no ACK response from the STA, the AP transmits a retransmission packet P1(1). At such time, the packet length of the packet P1(1) becomes longer than the packet P1 due to fallback control. Thereafter, similarly, the STA is not able to receive a packet and the AP repeats retransmission. Therefore, the AP determines that an interference state has been entered, stops fallback control together with increasing the number of times that retransmission is carried out, and retransmits a packet P1(3) at the same transmission rate as a retransmission packet P1(2). At such time, since an interval is entered in which disturbance waves generated by the microwave oven have stopped, the STA receives the packet P1(3) properly and returns an ACK response to the AP. When the ACK response from the STA is received, the AP reads out a TSF timer value ta of that reception start time, and a transmission timing initial value tp0 obtained by the following Expression 1 and Expression 2 is obtained.

$$tp0=ta-Td \quad \text{(Expression 1)}$$

$$Td=T(P1(r))+Tsifs \quad \text{(Expression 2)}$$

In Expression 1, Td is the time period required from the packet transmission start to the ACK response transmission start and is obtained by Expression 2. In Expression 2, T(P1(r)) is the time period length of the data of the packet P1 when retransmission is carried out for the $r^{th}$ time, and Tsifs is a short inter-frame space (SIFS) time period, which is specified in IEEE 802.11 and is the interval from the packet transmission end to the ACK response transmission start. FIG. 4 depicts a situation where a retransmission count r is 3.

It should be noted that, as a substitute for the aforementioned operation, the AP may retain the transmission timing initial value tp0 when the packet P1(3) is transmitted.

Next, the AP obtains a packet transmission timing tp(i) that is transmitted thereafter, with the following Expression 3.

$$tp(i)=tp0+Ti\times i \quad \text{(Expression 3)}$$

In Expression 3, Ti is the interference period and is ½ of the inverse of the commercial power supply frequency of the microwave oven.

In this way, with Expression 3, the AP thereafter sets the transmission timing for a packet to be transmitted and, when the set transmission timing arrives, starts transmission as long as there is a frame to be transmitted. In FIG. 4, a packet P2 is transmitted at the timing of a time point tp(1). At such time, since the output of disturbance waves generated by the microwave oven has stopped, the STA receives the packet P2 properly and returns an ACK response. Here, since there are no disturbance waves caused by the microwave oven, the packet P2 is able to be received at the transmission rate for when normal communication is carried out, and the AP therefore returns to the transmission rate of the normal communication state that is the same as when the packet P1 was transmitted and transmits the packet P2. Thereafter, the AP repeats the same operation in the interference state.

Lastly, in FIG. 3, the interference detection circuit 15 periodically measures power, and if it is determined that the power of the disturbance waves caused by interference has decreased and there are no longer any effects of interference (S24), the number of times that retransmission is carried out is returned to the normal communication state settings, and a transition is made to the communication state (S25).

According to the aforementioned operation, the wireless communication terminal 100 is able to carry out wireless communication in an interval in which disturbance waves generated by the microwave oven have stopped, and is able to avoid retransmission being repeated many times due to the effects of interference from the microwave oven. Furthermore, as a result of retransmission not being carried out many times, it is possible to avoid the wireless band being unnecessarily occupied together with suppressing the power consumption of the wireless communication terminal 100.

A description has been given in Embodiment 1 regarding the operation of the wireless communication terminal 100; however, it should be noted that the wireless communication terminal 100 may be either an access point (AP) or a station (STA) specified in the IEEE 802.11 standard.

Furthermore, in Embodiment 1, the transmission rate is returned to the transmission rate in the normal state when the wireless communication terminal 100 in the interference state transmits a packet; however, the transmission rate at such time may be set to a transmission rate between the transmission rate at which wireless communication succeeded immediately prior to transitioning to the interference state and the transmission rate in the normal state.

Furthermore, in the Embodiment 1, the packet that is transmitted after the packet P2 is transmitted at a transmission timing tp(2); however, when the packet length is short, transmission may be carried out after the ACK response for the packet P1.

(Embodiment 2)

Figure 5:
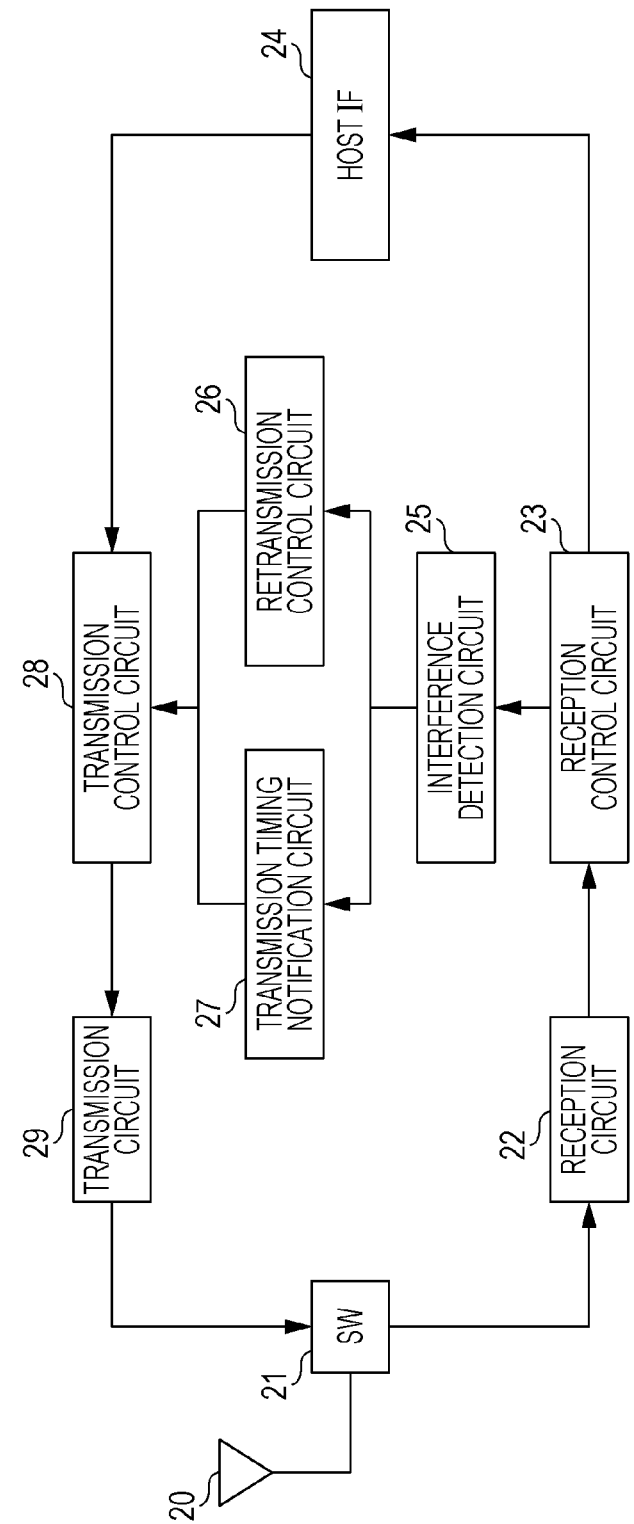
FIG. 5 is a block diagram depicting an example of a station in Embodiment 2.

FIG. 5 is a block diagram depicting the configuration of a station (STA) constituting one wireless communication terminal in Embodiment 2 of the present disclosure.

In FIG. 5, an STA 101 is provided with an antenna 20, a switch 21, a reception circuit 22, a reception control circuit 23, a host interface 24, an interference detection circuit 25, a retransmission control circuit 26, a transmission timing notification circuit 27, a transmission control circuit 28, and a transmission circuit 29.

The antenna 20, the switch 21, the reception circuit 22, the reception control circuit 23, the host interface 24, the interference detection circuit 25, the retransmission control circuit 26, the transmission control circuit 28, and the transmission circuit 29 of the station 101 each carry out the same operation as the antenna 10, the switch 11, the reception circuit 12, the reception control circuit 13, the host interface 14, the interference detection circuit 15, the retransmission control circuit 16, the transmission control circuit 18, and the transmission circuit 19 of the wireless communication terminal 100 in Embodiment 1.

The transmission timing notification circuit 27 outputs a transmission timing initial value detected in the interference detection circuit 25 to the transmission control circuit 28 as data to be notified to an AP, converts the data into a frame, and transmits the frame to the AP, which is described hereinafter.

Figure 6:
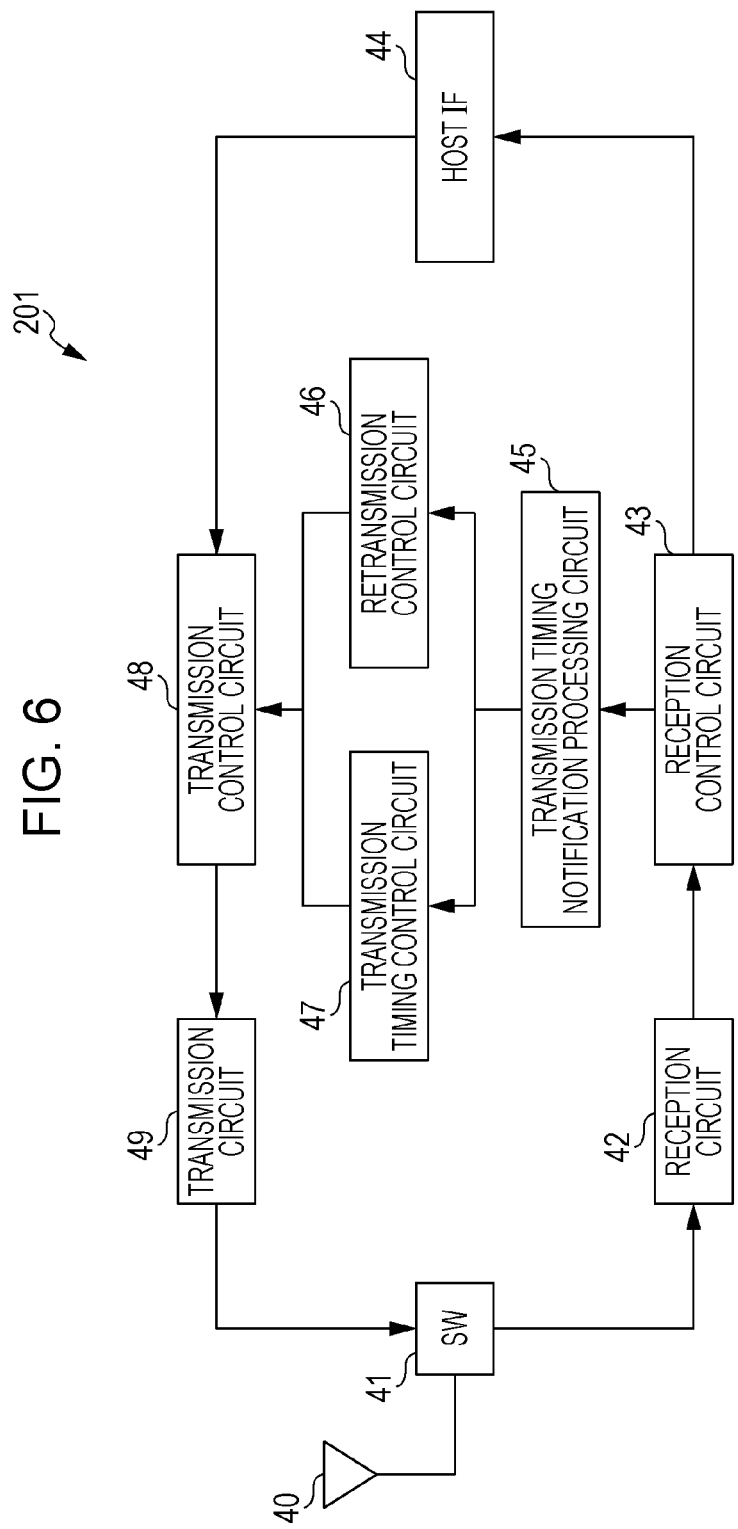
FIG. 6 is a block diagram depicting an example of an access point in Embodiment 2.

FIG. 6 is a block diagram depicting the configuration of an access point (AP) constituting one wireless communication terminal in Embodiment 2 of the present disclosure.

In FIG. 6, an AP 201 is provided with an antenna 40, a switch 41, a reception circuit 42, a reception control circuit 43, a host interface 44, a transmission timing notification processing circuit 45, a retransmission control circuit 46, a transmission timing control circuit 47, a transmission control circuit 48, and a transmission circuit 49.

The antenna 40, the switch 41, the reception circuit 42, the reception control circuit 43, the host interface 44, the retransmission control circuit 46, the transmission timing control circuit 47, the transmission control circuit 48, and the transmission circuit 49 of the AP 201 each carry out the same operation as the antenna 10, the switch 11, the reception circuit 12, the reception control circuit 13, the host interface 14, the retransmission control circuit 16, the transmission timing control circuit 17, the transmission control circuit 18, and the transmission circuit 19 of the wireless communication terminal 100 in Embodiment 1.

The transmission timing notification processing circuit 45 retrieves the transmission timing initial value from the frame received by the reception control circuit 43 from the aforementioned STA 101, and outputs the transmission timing initial value to the transmission timing control circuit 47.

Figure 7:
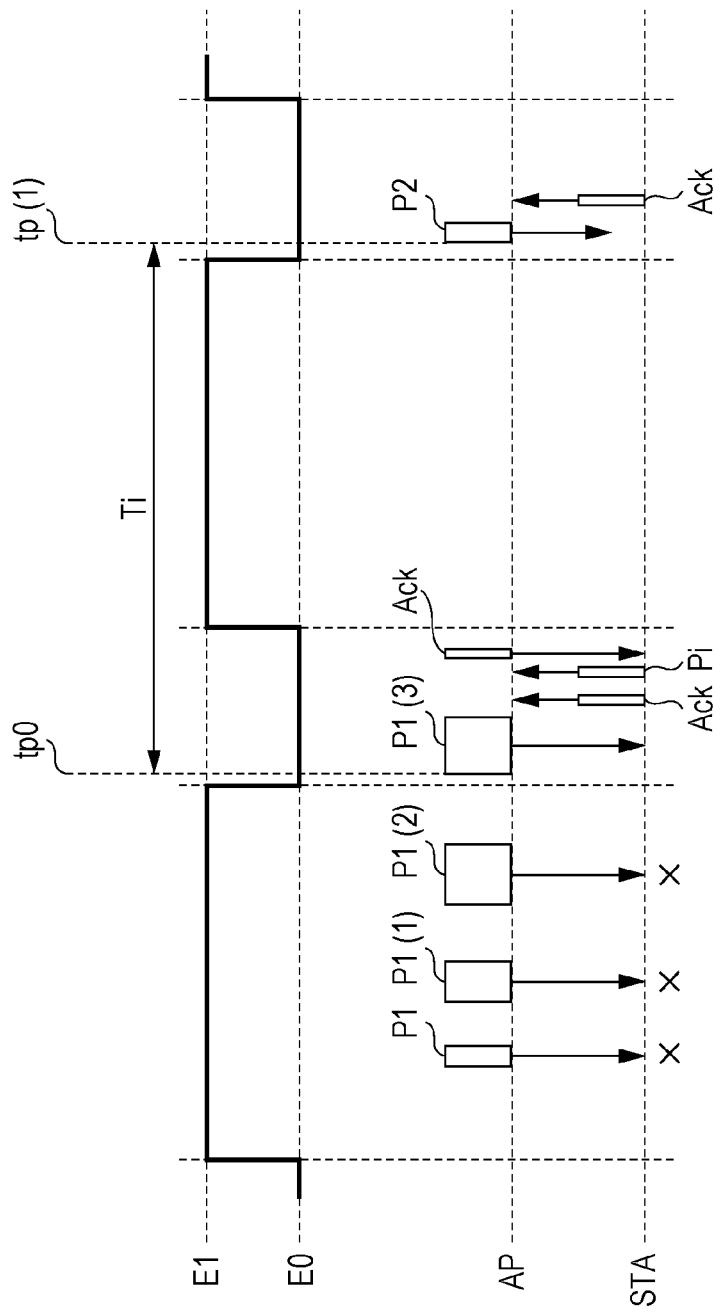
FIG. 7 is a drawing depicting an example of interference waves and packet retransmission between wireless communication devices in Embodiment 2.

FIG. 7 will be used to provide a detailed description regarding the operation of the STA and the AP configured as described above.

In FIG. 7, the STA is affected by disturbance waves generated by a microwave oven; however, the AP is set up outside the range of the effects of the disturbance waves generated by the microwave often. Therefore, a packet P1 transmitted by the AP cannot be received and the AP repeatedly retransmits the packet P1. However, because the AP is not affected by the disturbance waves generated by the microwave oven, the interference power level is not able to be detected and retransmission is repeated while the transmission rate is decreased due to fallback control. If an ACK response from the STA is not able to be received even after having carried out retransmission several times, the AP stops fallback control and retransmits the packet P1. In FIG. 7, at the third retransmission, a packet P1(3) is transmitted at the same transmission rate as the second retransmission.

If the STA receives the packet P1(3) from the AP in a state where interference is being detected in the interference detection circuit 25, the STA transmits an ACK response and also reads out and retains a TSF timer value of that reception start time point as a transmission timing initial value tp0. In addition, the STA transmits the transmission timing initial value tp0 to the AP as a transmission timing notification packet Pi.

If the transmission timing notification packet Pi is received, the AP retains the transmission timing initial value tp0, and uses Expression 3 in Embodiment 1 to obtain a packet transmission timing tp(i) that is transmitted thereafter. In this way, the AP thereafter sets the transmission timing for a packet to be transmitted, and, when the set transmission timing arrives, starts transmission as long as there is a frame to be transmitted.

Furthermore, if a return is made to the normal communication state from the interference state, the STA notifies the AP that the interference state is no longer in effect, and the AP carries out wireless communication in the normal communication state.

According to the aforementioned operation, when set up outside the range of the effects of interference from the microwave often, the AP is able to determine an interval in which disturbance waves generated by the microwave oven have stopped, and is able to avoid retransmission being repeated many times due to the effects of interference from the microwave oven.

The timing at which the STA transmits the transmission timing notification packet Pi is set as being after reception of the packet P1(3) from the AP; however, it should be noted that transition may be carried out at the next transmission timing tp(1).

Furthermore, if the AP is continuously unsuccessful in wireless communication with a specific STA, it is permissible for a short test packet to be continuously transmitted to the specific STA with the transmission rate remaining fixed, and the STA to be able to detect an interval in which disturbance waves of the microwave oven have stopped.

(Embodiment 3)

Figure 8:
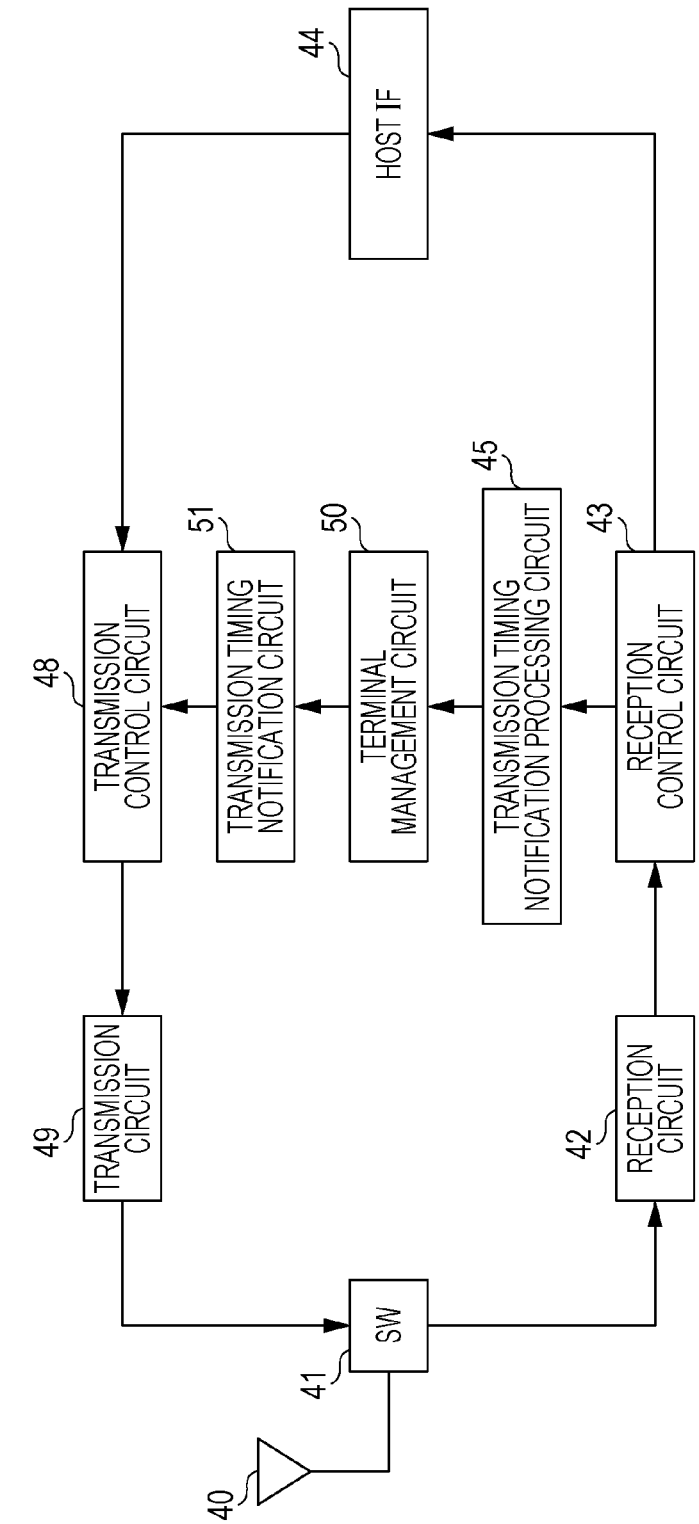
FIG. 8 is a block diagram depicting an example of an access point in Embodiment 3.

FIG. 8 is a block diagram depicting the configuration of an access point (AP) in Embodiment 3 of the present disclosure.

In FIG. 8, an AP 202 is provided with an antenna 40, a switch 41, a reception circuit 42, a reception control circuit 43, a host interface 44, a transmission timing notification processing circuit 45, a terminal management circuit 50, a transmission timing notification circuit 51, a transmission control circuit 48, and a transmission circuit 49.

The antenna 40, the switch 41, the reception circuit 42, the reception control circuit 43, the host interface 44, the transmission timing notification processing circuit 45, the transmission control circuit 48, and the transmission circuit 49 of the AP 202 each carry out the same operation as the constituent elements having the same names in the AP 201 of Embodiment 2.

The terminal management circuit 50 manages the media access control (MAC) address of an STA that has transmitted a transmission timing notification packet Pi. The transmission timing notification circuit 51 transmits a transmission timing notification packet that notifies a transmission timing initial value tp0 to the STA being managed by the terminal management circuit 50.

Figure 9:
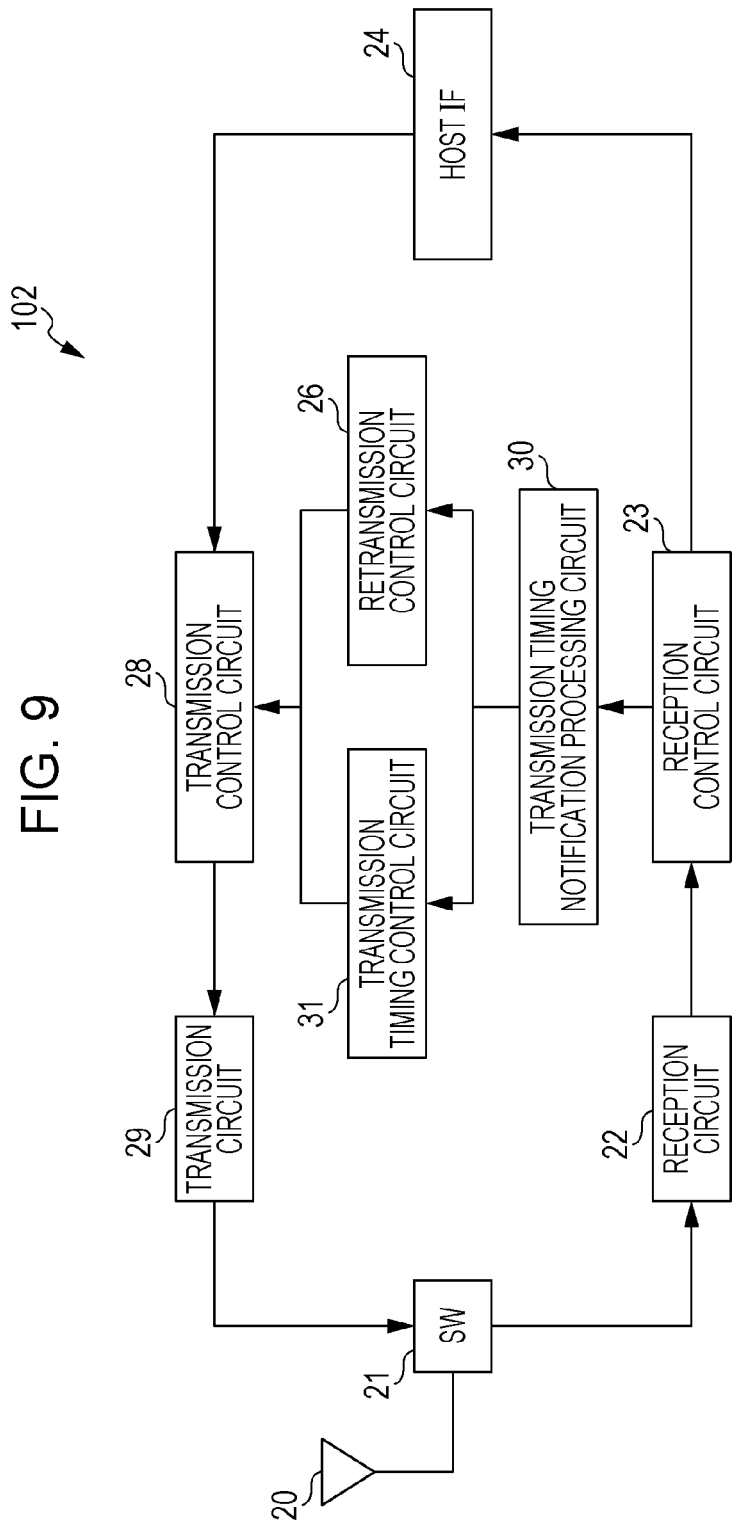
FIG. 9 is a block diagram depicting an example of a station in Embodiment 3.

FIG. 9 is a block diagram depicting the configuration of a station (STA) in Embodiment 3 of the present disclosure.

In FIG. 9, an STA 102 is provided with an antenna 20, a switch 21, a reception circuit 22, a reception control circuit 23, a host interface 24, a transmission timing notification processing circuit 30, a retransmission control circuit 26, a transmission timing control circuit 31, a transmission control circuit 28, and a transmission circuit 29.

The antenna 20, the switch 21, the reception circuit 22, the reception control circuit 23, the host interface 24, the retransmission control circuit 26, the transmission control circuit 28, and the transmission circuit 29 of the STA 102 each carry out the same operation as in the STA 101 in Embodiment 2.

The transmission timing notification processing circuit 30 reads out a transmission timing initial value from a frame received by the reception control circuit 23 from the AP, and outputs the transmission timing initial value to the transmission timing control circuit 31 and the retransmission control circuit 26. The transmission timing control circuit 31 notifies the transmission timing of a packet to the transmission control circuit 28.

Figure 10:
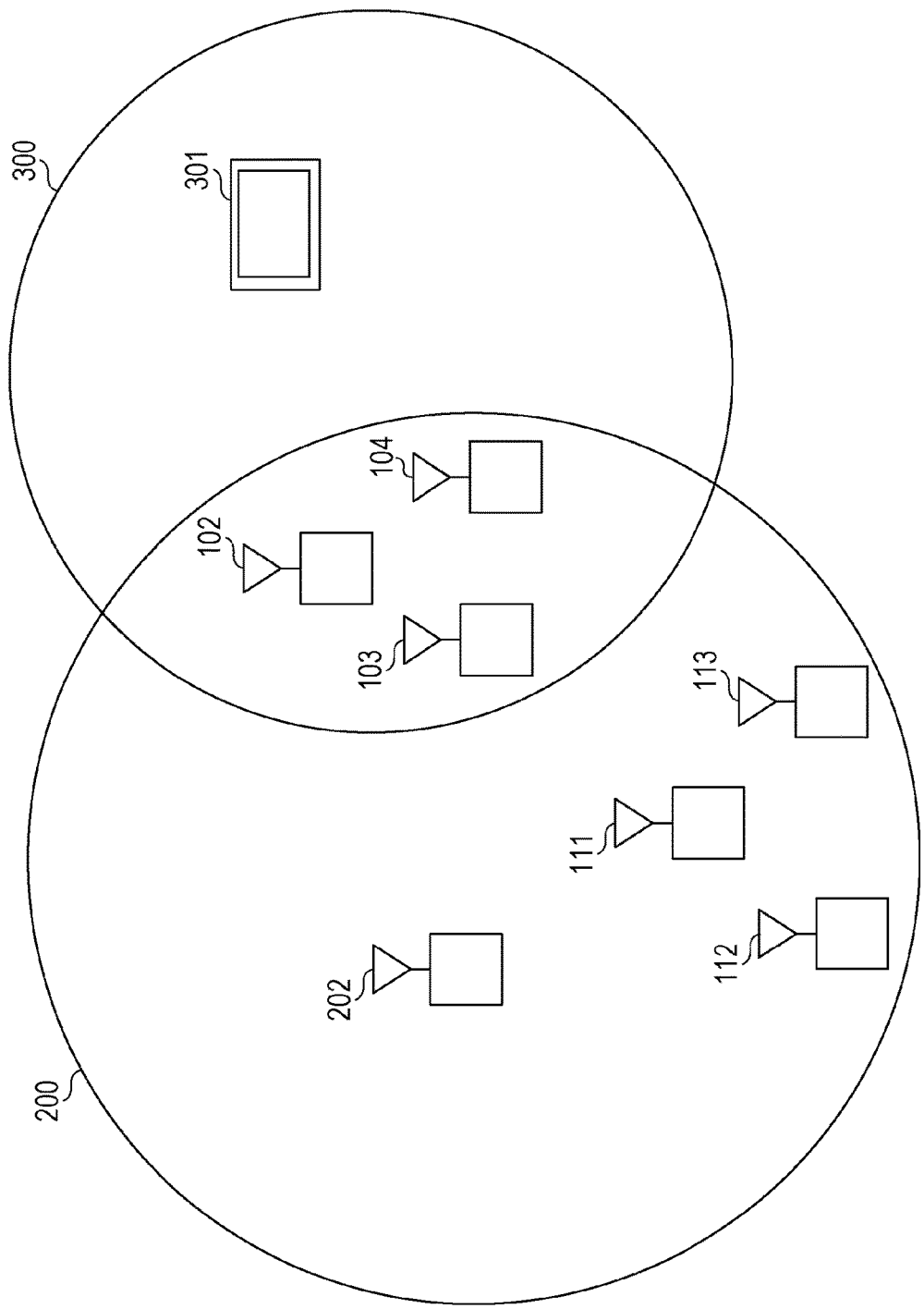
FIG. 10 is a block diagram depicting an example of a wireless communication device in Embodiment 3.

FIG. 10 will be used to provide a detailed description regarding the operation of the AP and the STA configured as described above.

In FIG. 10, STAs 102 to 104 and STAs 111 to 113 belong to an area 1 in which the AP 202 is able to carry out wireless communication, and a wireless communication network is formed. Furthermore, the STAs 102 to 104 also belong to an area 2 in which they are affected by disturbance waves output by a microwave oven 301 at the same time.

In a situation where the AP 202 and the STAs 102 to 104 are set up in this way, when the AP 202 sequentially transmits a packet to the STA 102, the STA 103, and the STA 104, the STAs 102 to 104 are not able to receive the packet due to the effects of the disturbance waves generated by the microwave oven, and the AP 202 repeats the retransmission of the packet. However, the AP 202 is not affected by the disturbance waves generated by the microwave oven and is therefore not able to detect the interference power level. In this kind of situation, as demonstrated in Embodiment 2, the STAs 102 to 104 notify a transmission timing initial value by way of a transmission timing notification packet to the AP 202.

When the transmission timing notification packet is received from the STAs 102 to 104, the AP 202 outputs the MAC addresses of the STAs 102 to 104 and the transmission timing initial value to the terminal management circuit 50 by way of the transmission timing notification processing circuit 45. The terminal management circuit 50 manages the MAC addresses of the STAs 102 to 104 and also averages the transmission timing initial values thereof and outputs the result to the transmission timing notification circuit 51.

When the microwave oven 301 has stopped operating, the STAs 102 to 104 notify the AP 202 that there are no longer any effects of interference from the microwave oven.

Next, when the microwave oven operates once again, any of the STAs 102 to 104 that first detected interference from the microwave oven transmits a transmission timing notification packet to the AP 202. Once the transmission timing notification packet has been received, the AP 202 notifies a timing at which packet transmission is started thereafter and that packet transmission is started in each interference period of the microwave oven, by way of a transmission timing notification packet, to the STAs 102 to 104 managed by the terminal management circuit 50.

It should be noted that the transmission timing notification packet may also be transmitted by sequential unicasts to the STAs 102 to 104, or the STAs 102 to 104 may be grouped and given a group address, and the transmission timing notification packet may be multicast-transmitted to the group address.

Once the transmission timing notification packet has been received, the STAs 102 to 104 extract the transmission timing from the transmission timing notification packet and thereafter start packet transmission in each interference period of the microwave oven from the transmission timing.

Furthermore, the STAs 111 to 113 that are unaffected by interference from the microwave oven do not receive the transmission timing notification packet and therefore communicate with the AP 202 irrespective of the transmission timing.

Furthermore, the AP 202 starts packet transmission at the transmission timing when there is data to be transmitted to the STAs 102 to 104, and starts packet transmission at any time irrespective of the transmission timing when there is data to be transmitted to the STAs 111 to 113.

According to the aforementioned operation, an STA that is affected by interference from a microwave oven is able to wirelessly communicate with an AP in an interval in which disturbance waves generated by the microwave oven have stopped, an STA that is set up outside the range of the effects of interference from the microwave oven is able to wirelessly communicates with the AP irrespective of the disturbance waves generated by the microwave oven, and overall it is possible for efficient wireless communication to be carried out as a wireless communication network.

In Embodiment 3, the AP 202 manages the MAC addresses of STAs that have notified a transmission timing initial value, and transmits a transmission timing only to the STAs of the managed MAC addresses; however, it should be noted that notification may also be carried out by broadcasting to all STAs.

Figure 11:
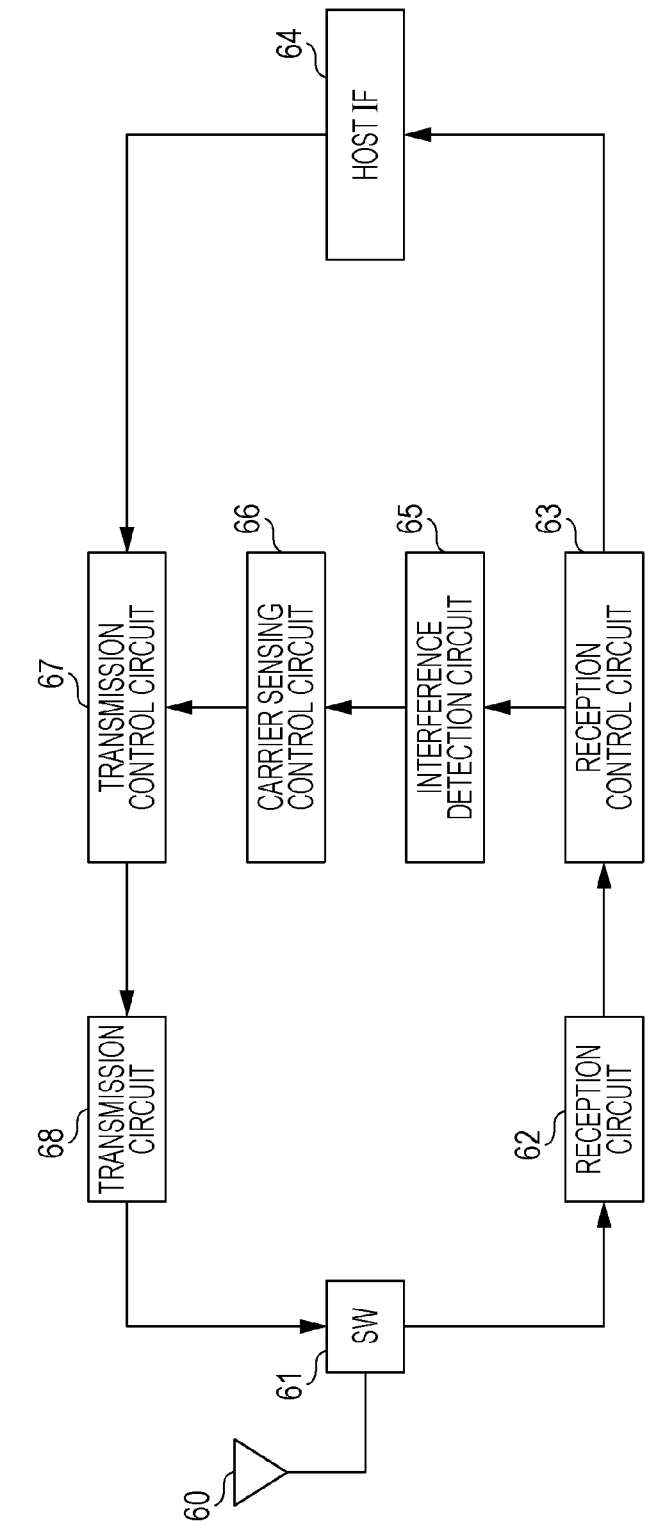
FIG. 11 is a block diagram depicting an example of an access point in Embodiment 4.

(Embodiment 4)
FIG. 11 is a block diagram depicting the configuration of an access point (AP) in Embodiment 4 of the present disclosure.

In FIG. 11, an AP 203 is provided with an antenna 60, a switch 61, a reception circuit 62, a reception control circuit 63, a host interface 64, an interference detection circuit 65, a carrier sensing control circuit 66, a transmission control circuit 67, and a transmission circuit 68.

The antenna 60, the switch 61, the reception circuit 62, the reception control circuit 63, the host interface 64, the interference detection circuit 65, and the transmission circuit 68 of the AP 203 each carry out the same operation as the antenna 10, the switch 11, the reception circuit 12, the reception control circuit 13, the host interface 14, the interference detection circuit 15, and the transmission circuit 19 of the wireless communication terminal 100 in Embodiment 1.

In addition to the operation of the transmission control circuit 18 of the wireless communication terminal 100 in Embodiment 1, the transmission control circuit 67 transmits a beacon frame specified in IEEE 802.11 in each prescribed period.

The carrier sensing control circuit 66 switches the carrier sensing scheme on the basis of an interference state determination result output by the interference detection circuit 65.

The two types of carrier sensing schemes of the preamble detection scheme and the level detection scheme are specified in the IEEE 802.11 standard. In the preamble detection scheme, it is determined that wireless media is being used if a preamble is detected, a preamble being the head portion of a physical layer frame specified in IEEE 802.11. In contrast to this, in the level detection scheme, the reception power is measured and it is determined that wireless media is being used if the reception power is equal to or greater than a prescribed reception power level.

When the preamble detection scheme is used as the carrier sensing scheme prior to a wireless terminal transmitting a packet, the start of packet transmission is postponed if a terminal conforming with the IEEE 802.11 standard is transmitting a packet, and it is there possible to avoid packets colliding within the wireless communication network.

On the other hand, when the level detection scheme is used as the carrier sensing scheme, packet transmission is postponed if a wireless terminal that uses the same frequency band, including wireless terminals of the IEEE 802.11 standard, is transmitting a packet. However, the 2.4 GHz band, which is an ISM band, is used by many wireless devices such as Bluetooth (registered trademark) devices and cordless telephones as well as wireless terminals of the IEEE 802.11 standard, and there are also the effects of disturbance waves generated by a microwave oven, and therefore an opportunity to transmit a packet is not readily obtained with the level detection scheme. Therefore, the preamble detection scheme is generally used even though there may be effects of interference with another wireless device.

Furthermore, the aforementioned beacon frame is broadcast-transmitted after carrier sensing of the preamble detection scheme has been carried out, in each prescribed period to all STAs belonging to a wireless communication network formed by an AP. Information such as a TSF timer counter is included in the beacon frame and it is possible for the AP and the STAs to establish time synchronization. If an STA is not able to receive this beacon frame a prescribed number of times, the STA determines that communication is not possible with the AP that forms part of the wireless communication network to which the STA currently belongs due to a reason such as being outside the communication range of the AP, and the STA searches for another AP.

However, this kind of situation also occurs when a microwave oven operates and the STA is affected by interference from the microwave oven and is not able to receive the beacon frame, and the connection between the AP and the STA is temporarily severed. This is because the AP is carrying out beacon transmission according to the carrier sensing of the preamble detection scheme despite being in an environment in which there are effects of disturbance waves from a microwave oven. When disturbance waves are being output from a microwave oven the output of which is far greater than the effects of disturbance caused by other wireless devices, it is desirable that the carrier sensing of the level detection scheme be carried out and intervals in which the disturbance waves of the microwave oven are being output be avoided to transmit the beacon.

Therefore, a carrier sensing control circuit is provided in the AP and, during normal communication, beacon transmission is carried out once the carrier sensing of the preamble detection scheme has been carried out. When the microwave oven operates and an interference state is entered, the carrier sensing scheme is switched to the level detection scheme and a beacon is transmitted. When it is no longer the interference state, the carrier sensing scheme is once again switched to the preamble detection scheme.

However, because the level of the disturbance waves generated by a microwave oven is ordinarily not fixed and is random, with the carrier sensing of the level detection scheme, there are situations where, although carrier sensing is carried out, the carrier sensing fails and beacon transmission is started, due to the set value for the reception power level that is to be detected. Even in cases such as this, the STA is able to receive a beacon since carrier sensing does not fail every time when a beacon is transmitted.

According to the aforementioned operation, even in a state where a microwave oven operates and there are effects of interference therefrom, wireless communication can be continued without the connection between an AP and an STA being severed.

(Embodiment 5)

Figure 12:
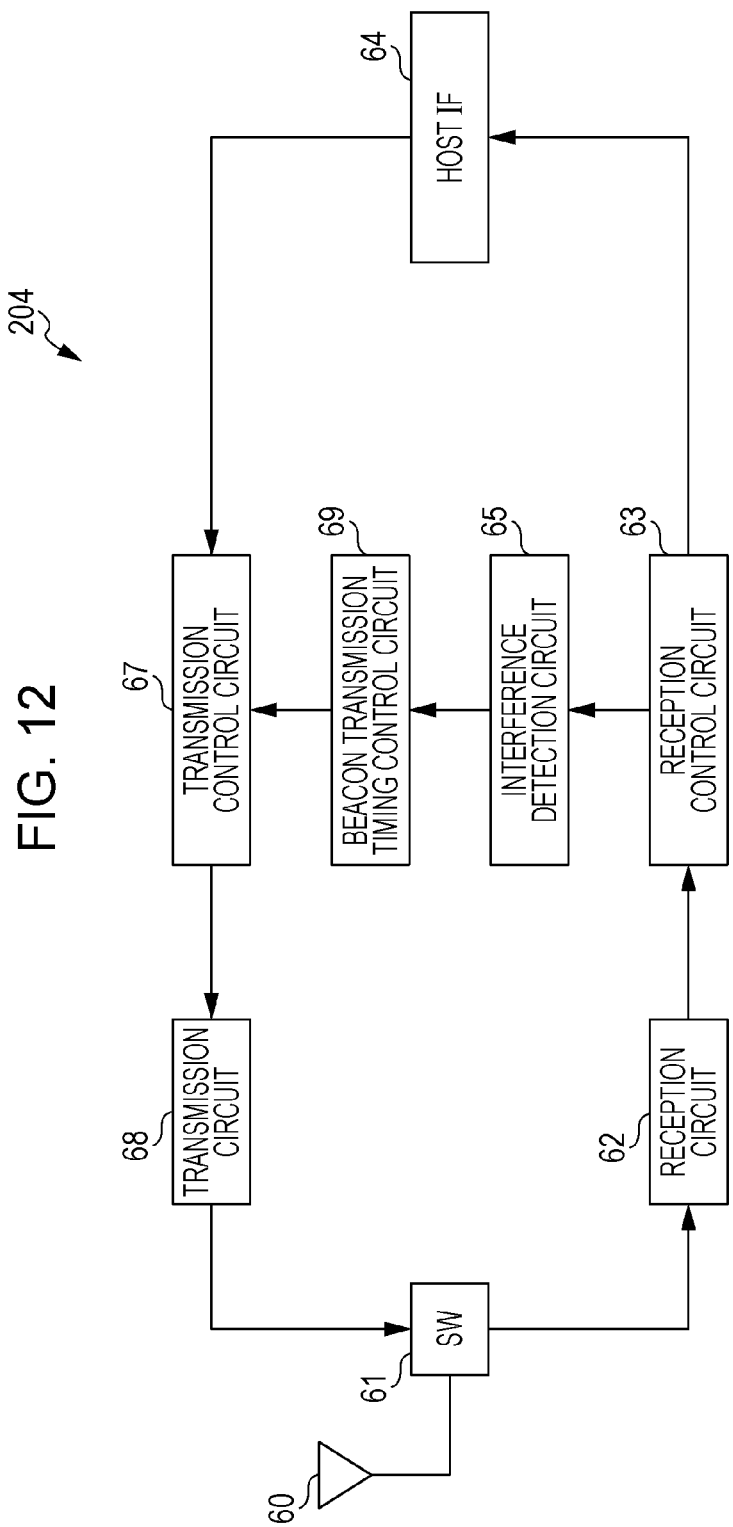
FIG. 12 is a block diagram depicting an example of an access point in Embodiment 5.

FIG. 12 is a block diagram depicting the configuration of an access point (AP) in Embodiment 5 of the present disclosure.

In FIG. 12, an AP 204 is provided with an antenna 60, a switch 61, a reception circuit 62, a reception control circuit 63, a host interface 64, an interference detection circuit 65, a beacon transmission timing control circuit 69, a transmission control circuit 67, and a transmission circuit 68.

The antenna 60, the switch 61, the reception circuit 62, the reception control circuit 63, the host interface 64, the interference detection circuit 65, and the transmission circuit 68 of the AP 204 each carry out the same operation as the constituent elements having the same names in the AP 203 of Embodiment 4.

Figure 13:
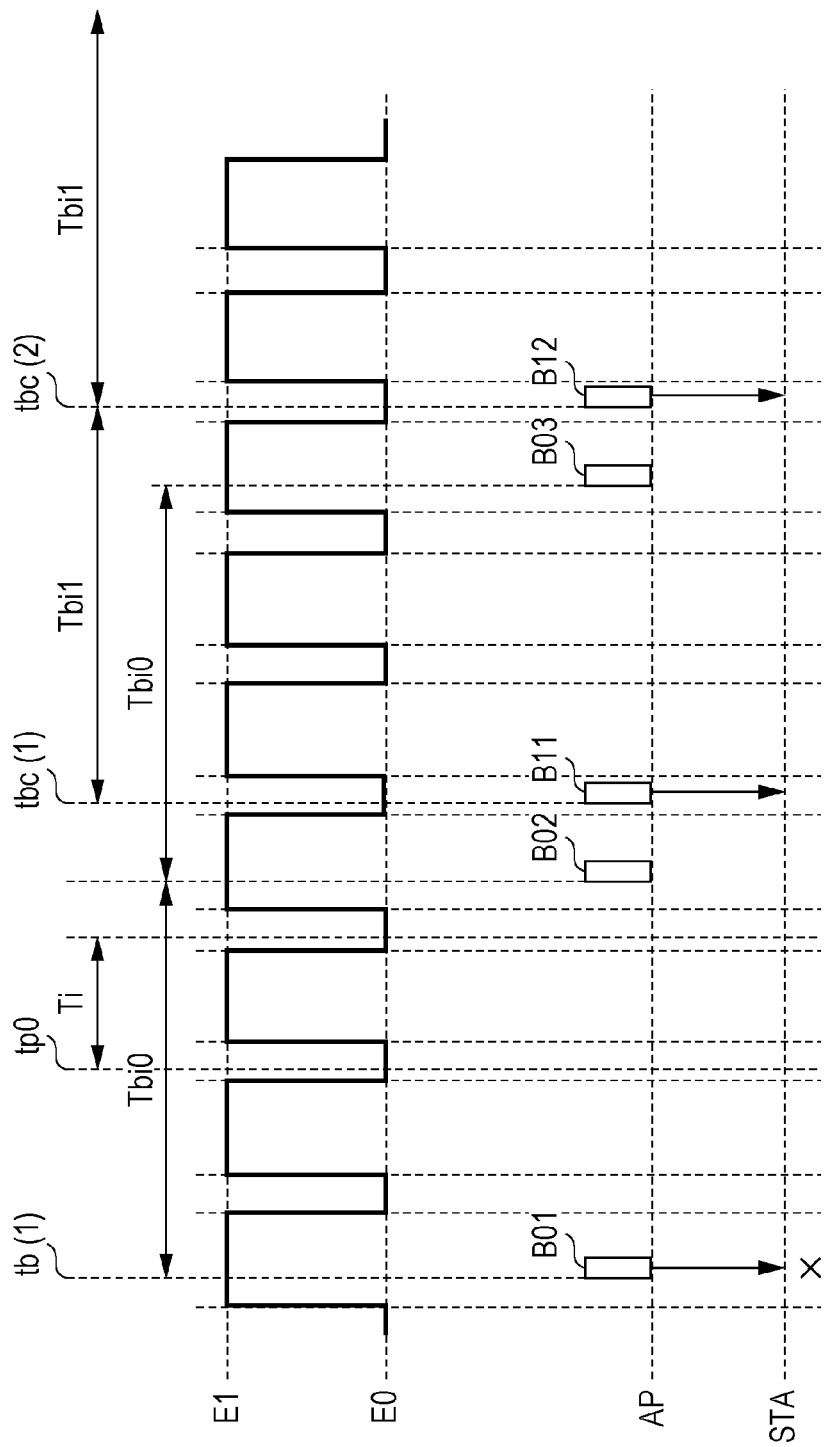
FIG. 13 is a drawing depicting an example of interference waves and the transmission timings of beacons transmitted by an access point in Embodiment 5.

FIG. 13 will be used to provide a detailed description regarding the operation of the AP 204 configured as described above.

In FIG. 13, neither of an AP and an STA is able to properly receive a packet in intervals in which a microwave oven is generating disturbance waves. The AP broadcast-transmits a beacon at intervals of a time period Tbi0 to all of the STAs that belong to the wireless communication network. However, the STAs are not able to receive the beacon due to the effects of the disturbance waves generated by the microwave oven. When this kind of situation continues, the STAs sever the disconnection with the AP and search for another AP with which connection is possible.

Therefore, if the AP has determined that there is an effect from the disturbance waves of the microwave oven by way of the interference detection circuit 65, Expression 4 is used to obtain a beacon transmission timing tbc(i) from a transmission timing initial value tp0 as in Embodiment 1.

$$tbc(1)=tp0+Ti \times k \qquad \text{(Expression 4)}$$

In Expression 4, Ti is the interference period and is ½ of the inverse of the commercial power supply frequency of the microwave oven, k is an integer, and tbc(1) is the smallest value that satisfies Expression 5.

$$tbc(1) \geq tb(1)+Tbi0 \qquad \text{(Expression 5)}$$

In Expression 5, Tbi0 is a period in which an AP during normal wireless communication transmits a beacon. In other words, after having transmitted a beacon B01 at the time point tbc(1), the AP is supposed to transmit a beacon B02 after the time period Tbi0; however, this is moved to the next interval in which disturbance waves generated by the microwave oven have stopped, and the transmission of a beacon B11 is started at the time point tbc(1). Thereafter, the AP starts beacon transmission at time period Tbi1 intervals. Tbi1 is obtained with Expression 6.

$$Tbi1 = Ti \times m \qquad \text{(Expression 6)}$$

In Expression 6, m is an integer.

According to the aforementioned operation, even in a state where a microwave oven operates and there are effects of interference therefrom, an AP is able to transmit a beacon during an interval in which disturbance waves generated by the microwave oven have stopped, it becomes possible for an STA to receive the beacon properly, and wireless communication can be continued without the connection between the AP and the STA being severed.

(Embodiment 6)

Figure 14:
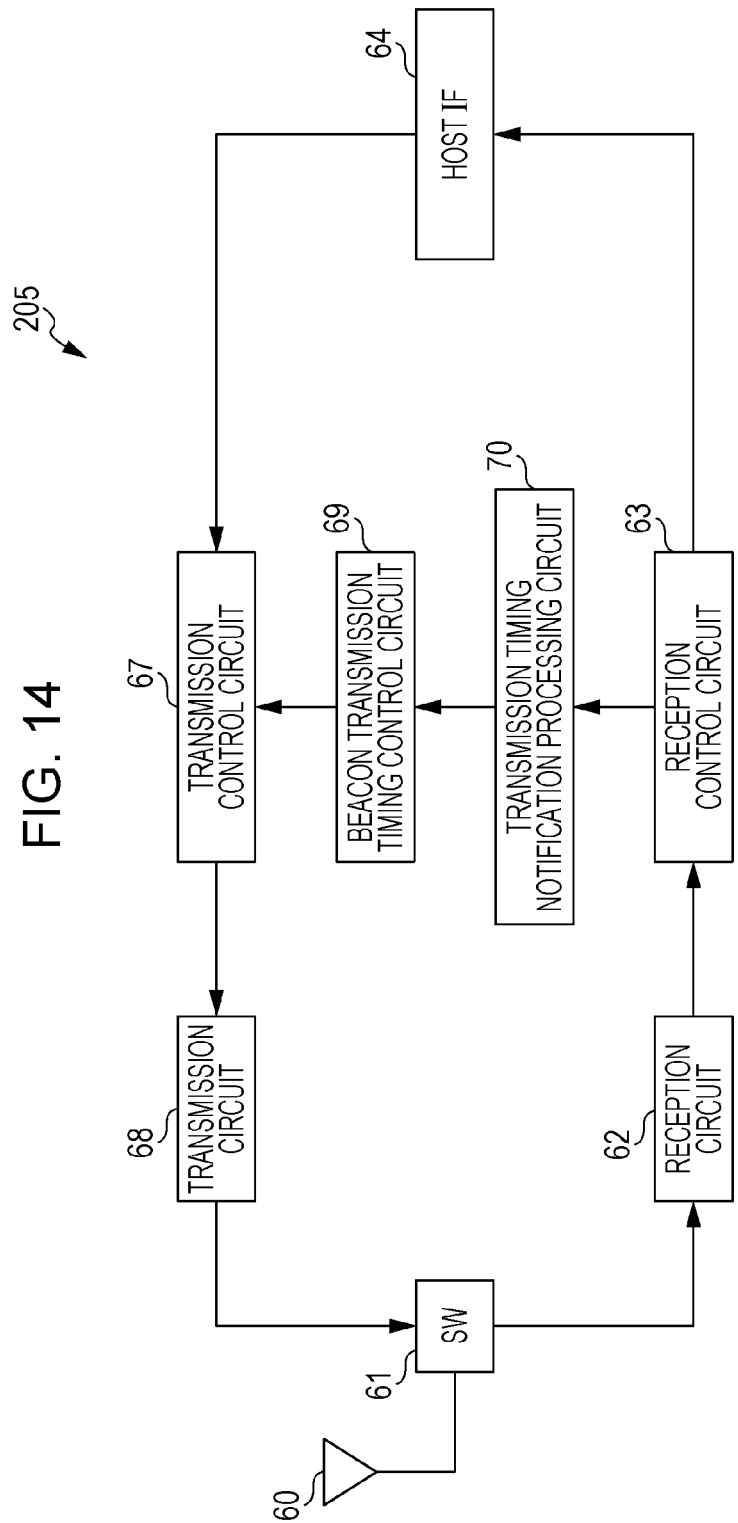
FIG. 14 is a block diagram depicting an example of an access point in Embodiment 6.

FIG. 14 is a block diagram depicting the configuration of an access point (AP) in Embodiment 6 of the present disclosure.

In FIG. 14, an AP 205 is provided with an antenna 60, a switch 61, a reception circuit 62, a reception control circuit 63, a host interface 64, a transmission timing notification processing circuit 70, a beacon transmission timing control circuit 69, a transmission control circuit 67, and a transmission circuit 68.

The antenna 60, the switch 61, the reception circuit 62, the reception control circuit 63, the host interface 64, the beacon transmission timing control circuit 69, the transmission control circuit 67, and the transmission circuit 68 of the AP 205 each carry out the same operation as the constituent elements having the same names in the AP 204 of Embodiment 5.

A detailed description will be given regarding the operation of the AP 205 configured as described above.

In a situation where the AP 205 is set up outside of the range of the effects of disturbance waves generated by a microwave oven, an STA that is being affected by interference from the microwave oven is not able to receive a packet transmitted by the AP 205. Therefore, the STA that is being affected by interference from the microwave oven carries out the operation in Embodiment 2 and transmits a transmission timing notification packet to the AP 205. By way of the transmission timing notification processing circuit 70, the AP 205 carries out reception processing for the transmission timing notification packet transmitted by the STA and notifies a transmission timing initial value tp0 to the beacon transmission timing control circuit 69.

The beacon transmission timing control circuit 69 uses the transmission timing initial value tp0 to obtain the beacon transmission timing tbc(i) described in Embodiment 5 and outputs such to the transmission control circuit 67. Thereafter, the AP 205 transmits a beacon at the beacon transmission timing tbc(i).

According to the aforementioned configurations, even when set up outside of the range of the effects of disturbance waves generated by a microwave oven, it becomes possible for an AP to transmit a beacon during an interval in which the disturbance waves of the microwave oven have stopped. Therefore, an STA that is being affected by interference from the microwave oven is able to properly receive a beacon transmitted by the AP, and the connection with the AP is able to be continued.

(Embodiment 7)

Figure 15:
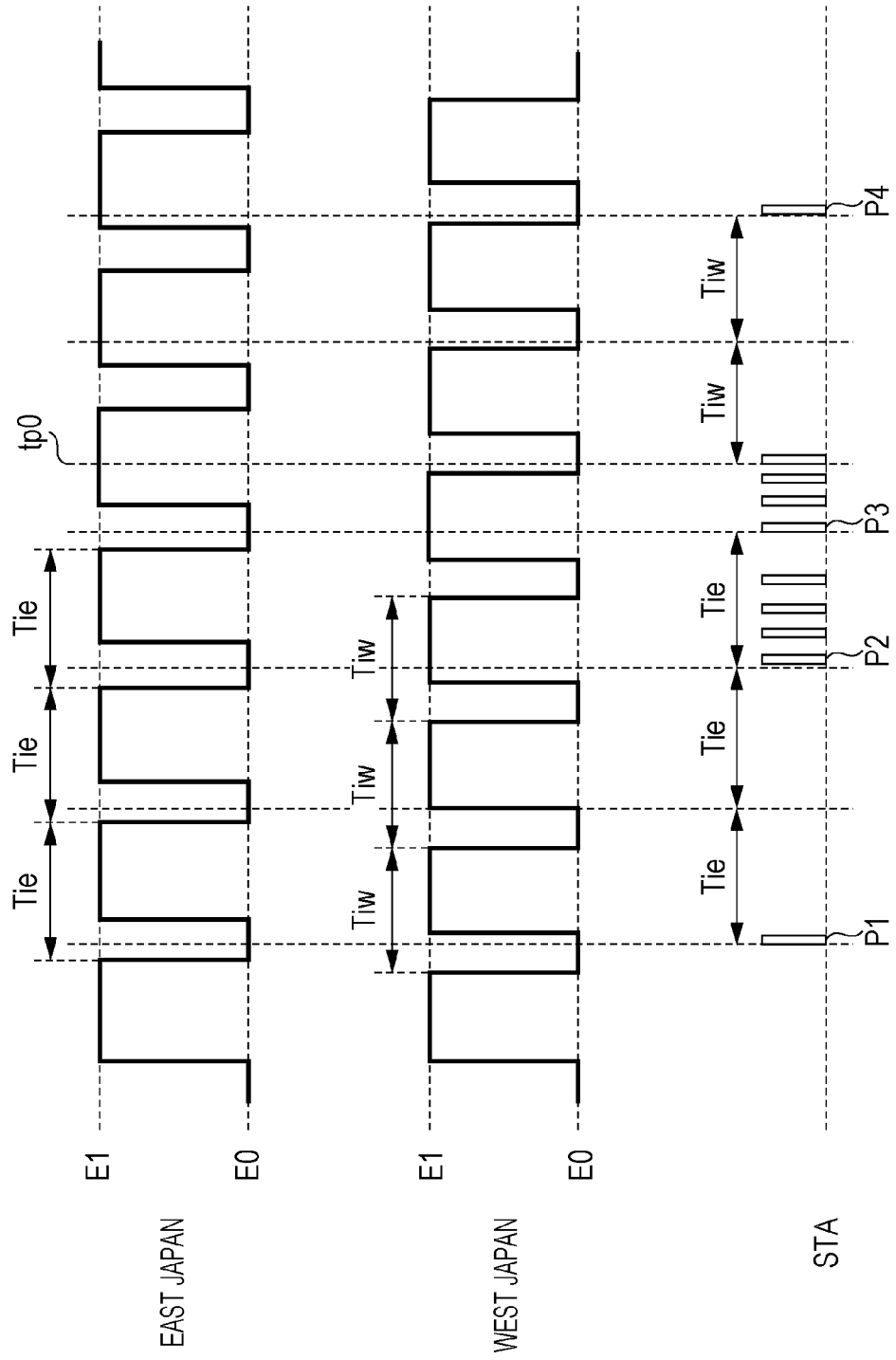
FIG. 15 is a drawing depicting an example of interference waves and the transmission timings of packets transmitted by a wireless communication device in Embodiment 7.

FIG. 15 is a drawing depicting an example of interference waves and the transmission timings of packets transmitted by an STA in Embodiment 7 of the present disclosure.

In Embodiment 1, a period of a disturbance wave generated by a microwave oven was taken as Ti; however, within Japan, the commercial power supply frequency is different in East Japan and West Japan, and that period Ti is therefore different in East Japan and West Japan.

The commercial power supply frequency in East Japan is 50 Hz, and therefore a period Tie in which an inverter-type microwave oven generates a disturbance wave is ½ of the inverse thereof and is approximately 10 msec. Although there are model dependent differences among inverter-type microwave ovens, generally, an interval in which disturbance waves are output is approximately 7.7 msec and an interval in which the output of disturbance waves is stopped is approximately 2.3 msec.

On the other hand, the commercial power supply frequency in West Japan is 60 Hz, and therefore a period Tiw in which an inverter-type microwave oven generates a disturbance wave is approximately 8.3 msec. In inverter-type microwave ovens, generally, the interval in which disturbance waves are output is approximately 6.3 msec and the interval in which the output of disturbance waves is stopped is approximately 2.0 msec.

When the method according to Embodiment 1 is used for an STA to transmit a packet at each period Tie, in the case of use in East Japan, wireless communication can be carried out in an interval in which disturbance waves generated by the microwave oven have stopped, and it therefore becomes possible to carry out wireless communication properly. However, in the case of use in West Japan, there occurs a deviation between the period Tie and the period Tiw, and even if it is temporarily possible to carry out wireless communication properly, the effects of the disturbance waves generated by the microwave oven are once again received and a wireless communication error occurs.

In FIG. 15, in the case of use in West Japan, when an STA that has detected interference transmits a packet P1, transmission is carried out in an interval in which the microwave oven stops outputting disturbance waves. However, when a packet P2 is transmitted, the packet P2 is transmitted in an interval in which the microwave oven generates disturbance waves, and retransmission is therefore repeated. Furthermore, a packet P3 is also transmitted after a time period Tie; however, the effects of disturbance waves are similarly received and retransmission is repeated.

With regard to this kind of problem, in Embodiment 7, the periods Tie and Tiw are switched in the transmission timing control circuit 17 in Embodiment 1. In other words, in an interference state, in the transmission timing control circuit 17, a period Ti is set to the period Tie of East Japan to obtain a transmission timing tp(i) and the transmission timing is determined. However, if it is detected that a packet is being once again continuously retransmitted, a TSF timer value to for a start time point at which retransmission was repeated and an ACK response was received is read out, and Expression 1 is used to obtain a transmission timing initial value tp0.

In addition, in Expression 3, the period Ti is switched to the period Tiw of West Japan to obtain the transmission timing tp(i) and, thereafter, packets are transmitted at that time point.

In FIG. 15, retransmission of the packet P3 is repeated, the transmission timing initial value tp0 is obtained from the timing at which retransmission was successful and, thereafter, the period is changed to Tiw and a packet P4 is transmitted.

According to the aforementioned operation, even when the period in which disturbance waves are output is different due to the region in which a microwave oven is set up, by changing that period, it becomes possible to avoid the effects of the disturbance waves from the microwave oven for wireless communication to be carried out properly.

(Embodiment 8)

Figure 16:
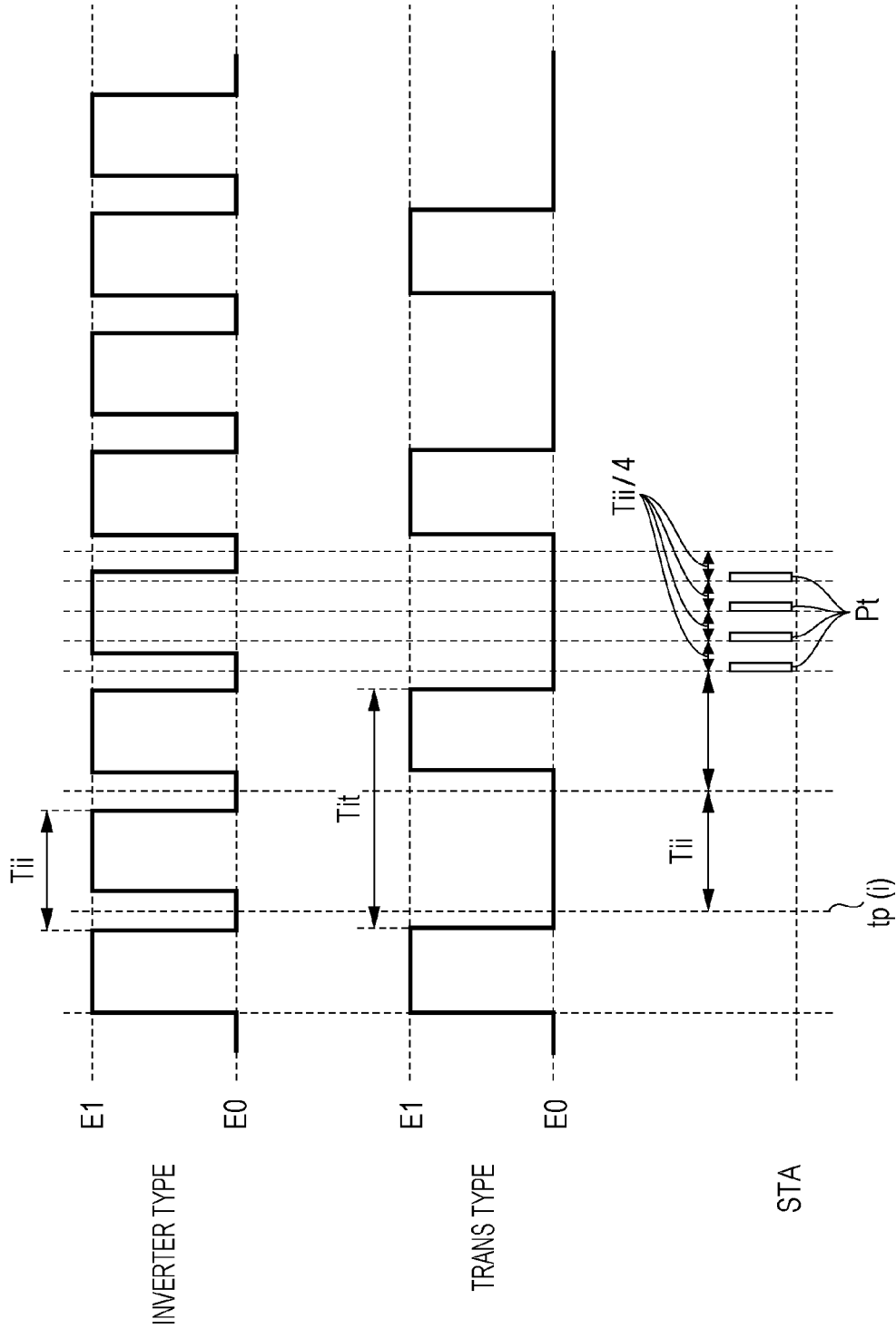
FIG. 16 is a drawing depicting an example of interference waves and the transmission timings of packets transmitted by a wireless communication device in Embodiment 8.

FIG. 16 is a drawing depicting an example of interference waves and the transmission timings of packets transmitted by an STA in Embodiment 8 of the present disclosure.

In Embodiment 1, a period of a disturbance wave generated by a microwave oven was taken as Ti; however, there are a plurality of types of microwave ovens. Inverter-type and trans-type microwave ovens are generally used and the periods thereof in which disturbance waves are generated are different. The period in which an inverter-type microwave oven generates disturbance waves is ½ of the inverse of the commercial power supply frequency; however, the period of a disturbance wave generated by a trans-type microwave oven is the inverse of the commercial power supply frequency, and the period in which disturbance waves are output is shorter than that of an inverter-type microwave oven.

In FIG. 16, a period Tii in which an inverter-type microwave oven generates disturbance waves is as described in Embodiment 7. With regard to a trans-type microwave oven, in East Japan, a period Tit in which disturbance waves are generated is approximately 20.0 msec and, although there are slight differences depending on the model, an interval in which disturbance waves are output is approximately 8.4 msec and an interval in which the output of disturbance waves is stopped is approximately 11.6 msec. On the other, in West Japan, a period Tit in which a trans-type microwave oven generates disturbance waves is approximately 16.7 msec and, although there are slight differences depending on the model, an interval in which disturbance waves are output is approximately 7.5 msec and an interval in which the output of disturbance waves is stopped is approximately 9.2 msec.

When the method according to Embodiment 1 is used to carry out wireless communication with the inverter-type period Tii being set as the period Ti in which a microwave oven generates disturbance waves, in an interference state, an STA transmits a packet in each period Tii. However, when the microwave oven actually being used is a trans-type microwave oven, the STA is not able to transmit packets even though the periods in which there is no effect from the disturbance waves generated by the microwave oven are long and there is no effect from interference.

Therefore, in order to determine whether or not the microwave oven actually being used is a trans-type microwave oven, after a period Tit, a test packet Pt is transmitted from a transmission time point tp(i) to detect the effects of interference. In FIG. 16, as an example, transmission is carried out at time points obtained by dividing the period Tii by four. In this case, it is determined that the microwave oven is a trans-type microwave oven if three or more ACK responses are able to be received when four test packets Pt are transmitted, for example.

If it is determined that the microwave oven is a trans-type microwave oven, after the transmission of a packet at the packet transmission timing tp(i), packet transmission is continued while the output of disturbance waves is stopped by the microwave oven. In this way, the STA continuously transmits packets if there are packets to be transmitted, and it is thereby possible for wireless transmission to be efficiently carried out in a period in which the output of disturbance waves is stopped by the microwave oven.

The aforementioned test packets were transmitted four times; however, it should be noted that it may be determined that the microwave oven is a trans-type microwave oven if transmission is carried out three or more times and it has been possible to receive an ACK response half or more of those times.

Furthermore, instead of transmitting test packets, the reception power level may be measured at timings at which test packets are transmitted, whether a reception power level that is equal to or greater than a prescribed power level is continuously detected may be confirmed, and it may be determined that the microwave oven is a trans-type microwave oven if such a reception power level is not continuously detected.

According to the aforementioned operation, even when the periods in which a microwave stops the output of disturbance waves are different due to differences in the type of microwave oven, those stop intervals can be detected and efficient wireless communication can be carried out.

It should be noted that, in the aforementioned embodiments, the constituent elements may be configured using dedicated hardware or may be realized by executing a software program suitable for the constituent elements. The constituent elements may be realized by a program execution unit such as a CPU or a processor reading out and executing a software program recorded in a recording medium such as a hard disk or a semiconductor memory. Here, software that realizes a wireless communication device and so forth of the aforementioned embodiments is a program such as the following.

In other words, this program causes a computer to execute a method for controlling a wireless communication device that communicates with a destination wireless communication device via a wireless communication network, the method including: transmitting first data to the destination wireless communication device; for an interval in which an ACK signal corresponding to the first data is not able to be received from the destination wireless communication device even though the first data has been transmitted, retransmitting the first data in a first transmission interval; and, when the ACK signal corresponding to the first data has been able to be received from the destination wireless communication device, switching a data transmission interval from the first transmission interval to a second transmission interval that corresponds to a period corresponding to an interference wave of a microwave oven, and transmitting second data that is subsequent to the first data to the destination wireless communication device at a timing at which the second transmission interval has elapsed after the first data has been transmitted.

Wireless communication and so forth according to one or more aspects has been described heretofore on the basis of embodiments; however, the present disclosure is not restricted to these embodiments. Modes in which various modifications conceived by a person skilled in the art have been implemented in the present embodiments, and modes constructed by combining constituent elements in different embodiments may also be included within the scope of one or more aspects provided they do not depart from the purpose of the present disclosure.

The present disclosure is effective in avoiding the effects of interference and also avoiding lines being disconnected in situations in which interference is generated, and can be applied for connecting a plurality of wireless communication devices to construct a wireless LAN system.

What is claimed is:
1. A wireless communication device comprising:
a wireless communicator that communicates with a destination wireless communication device via a wireless communication network; and
a communication controller that controls a transmission of data to the destination wireless communication device,
wherein,
when the wireless communicator does not receive an ACK signal corresponding to first data from the destination wireless communication device after transmitting the first data to the destination wireless communication device, the communication controller causes the wireless communicator to retransmit the first data, and,
when the wireless communicator receives an ACK signal corresponding to first data from the destination wireless communication device after transmitting the first data to the destination wireless communication device, the communication controller causes the wireless communicator to transmit second data that is subsequent to the first data to the destination wireless communication device after elapse of a prescribed time period after transmitting the first data or after receiving the ACK signal,
the prescribed time period is based upon:
determining a value of a cycle of an interference wave produced by operation of an interference device, and
utilizing the determined value of the cycle of the interference wave produced by operation of an interference device to determine the prescribed time period,
wherein the prescribed time period is determined by calculating ½ of an inverse of a commercial power supply frequency of a microwave oven.
2. The wireless communication device according to claim 1, wherein
each time the first data is retransmitted in a first transmission interval, the communication controller sets a transmission rate of the first data lower than the transmission rate used in the preceding transmission, and,
when the ACK signal corresponding to the first data is received from the destination wireless communication device, the communication controller sets the transmission rate used for transmission of the second data to a transmission rate used when the first data is initially transmitted.

3. The wireless communication device according to claim 1, wherein,
when a TSF timer value used for synchronizing each wireless communication device belonging to the wireless communication network is received from the destination wireless communication device, the communication controller uses the received TSF timer value to determine the transmission timing of the previously transmitted first data, and
the communication controller transmits the second data to the destination wireless communication device after elapse of the prescribed time period after transmitting the first data.

4. The wireless communication device according to claim 3, wherein
the wireless communication communicates with wireless communication devices, and
the communication controller causes the wireless communicator to transmit the second data to a wireless communication device that has transmitted the TSF timer value from among the wireless communication devices, and
performs normal transmission of the second data to a wireless communication device that has not transmitted the TSF timer value from among the wireless communication devices.

5. The wireless communication device according to claim 4, wherein
a signal indicating that data transmission is to be performed in a prescribed interval is transmitted to a destination wireless communication device that has transmitted the TSF timer value.

6. The wireless communication device according to claim 3, wherein,
when the ACK signal is received, the communication controller obtains a timer counter value for synchronization of each wireless communication device, and subtracts a prescribed value from the TSF timer value.

7. The wireless communication device according to claim 1, wherein
a first period and a second period having different values are set in the communication controller as cycles of interference waves of the interference device, and,
when the wireless communicator does not receive an ACK signal corresponding to the second data from the destination wireless communication device after transmitting the second data using either the first period or the second period, the communication controller switches a transmission interval for the second data from the one period to the other period of the first period and the second period.

8. The wireless communication device according to claim 7, wherein
the first period and the second period are either 50 Hz or 60 Hz.

9. The wireless communication device according to claim 4, wherein
the interference device is a microwave oven and a cycle of an interference wave of the microwave oven is a cycle of a radio wave generated by an inverter-type microwave oven, and,
when the wireless communicator does not receive an ACK signal corresponding to the second data from the destination wireless communication device after transmitting the second data after elapse of the prescribed time period, the communication controller causes the wireless communicator to perform carrier sensing within a fixed interval after transmitting the second data,
the communication controller determines a signal strength by performing the carrier sensing, and,
when the signal strength is equal to or less than a prescribed threshold value, the communication controller switches a data transmission interval to a cycle of a radio wave generated by a trans-type microwave oven.

10. The wireless communication device according to claim 4, wherein
the interference device is a microwave oven and a cycle of an interference wave of the microwave oven is a cycle of a radio wave generated by an inverter-type microwave oven,
when the wireless communicator does not receive an ACK signal corresponding to the second data from the destination wireless communication device after transmitting the second data in a second transmission interval, the communication controller causes the wireless communicator to transmit packet data within a fixed interval after transmitting the second data, and,
when the wireless communicator receives an ACK signal from the destination wireless communication device in response to transmission of the packet data, the communication controller switches a data transmission interval to a cycle of a radio wave generated by a trans-type microwave oven.

11. The wireless communication device according to claim 9, wherein,
in the communication controller, the fixed interval is an interval from when one cycle of the interference wave of the microwave oven has elapsed from the TSF timer value to when two cycles of the interference wave of the microwave oven has elapsed from the TSF timer value.

12. The wireless communication device according to claim 9, wherein,
in the communication controller, the fixed interval is an interval from the TSF timer value to a time after elapse of one cycle and a ¼ cycle, or one cycle and a ½ cycle, or one cycle and a ¾ cycle of the interference wave of the microwave oven.

13. A method for controlling a wireless communication device that communicates with a destination wireless communication device via a wireless communication network, the method comprising:
transmitting first data to the destination wireless communication device;
for an interval in which an ACK signal corresponding to the first data is not received from the destination wireless communication device after the first data is transmitted, retransmitting the first data in a first transmission interval;
when the ACK signal corresponding to the first data is received from the destination wireless communication device, switching a data transmission interval from the first transmission interval to a second transmission interval; and
transmitting second data that is subsequent to the first data to the destination wireless communication device after elapse of the second transmission interval after the first data is transmitted,
wherein the second transmission interval is based upon:
determining a value of a cycle of an interference wave produced by operation of an interference device, and utilizing the determined value of the cycle of the interference wave of the interference device to determine the second transmission interval,
wherein the second transmission interval is determined by calculating ½ of an inverse of a commercial power supply frequency of a microwave oven.

* * * * *